(12) United States Patent
Koganei et al.

(10) Patent No.: US 9,995,341 B2
(45) Date of Patent: Jun. 12, 2018

(54) RESIN CAGE FOR TAPERED ROLLER BEARING AND TAPERED ROLLER BEARING INCLUDING THE RESIN CAGE

(71) Applicant: NSK LTD., Tokyo (JP)

(72) Inventors: Makoto Koganei, Fujisawa (JP); Hiroshi Sakamoto, Fujisawa (JP); Daisuke Tominaga, Fujisawa (JP); Shunichi Kiyono, Fujisawa (JP); Mamoru Aoki, Fujisawa (JP); Tatsuya Minamiyama, Osaka (JP); Masayoshi Nakamura, Osaka (JP); Kiyoshi Yamamoto, Osaka (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 15/499,289

(22) Filed: Apr. 27, 2017

(65) Prior Publication Data
US 2017/0227052 A1    Aug. 10, 2017

Related U.S. Application Data

(63) Continuation of application No. 14/781,804, filed as application No. PCT/JP2014/059939 on Apr. 4, 2014, now abandoned.

(30) Foreign Application Priority Data

Apr. 4, 2013   (JP) .................................. 2013-078999
Apr. 4, 2013   (JP) .................................. 2013-079000

(51) Int. Cl.
F16C 33/46    (2006.01)
F16C 43/06    (2006.01)
(Continued)

(52) U.S. Cl.
CPC ........ F16C 33/4635 (2013.01); F16C 19/364 (2013.01); F16C 33/4605 (2013.01);
(Continued)

(58) Field of Classification Search
CPC .......................... F16C 19/364; F16C 33/4635; F16C 33/4676; F16C 33/585; F16C 33/6614;
(Continued)

(56) References Cited

U.S. PATENT DOCUMENTS 1,784,914 A   12/1930  Strickland et al.
2,059,181 A   10/1936  Wilson
(Continued)

FOREIGN PATENT DOCUMENTS

CN   101040125 A   9/2007
CN   101371056 A   2/2009
(Continued)

OTHER PUBLICATIONS

Office Action dated Jun. 15, 2017 issued by the United States Patent and Trademark Office in counterpart U.S. Appl. No. 15/446,245.
(Continued)

*Primary Examiner* — Marcus Charles
(74) *Attorney, Agent, or Firm* — Sughrue Mion, PLLC

(57) ABSTRACT

Provided is a resin cage for a tapered roller bearing in which a mold parting line which is extended in an axial direction is formed in a pillar portion defining a pocket. On facing surfaces of adjacent pillar portions, on an outer diameter side from the mold parting line, a first conical surface which slides in contact with an outer peripheral surface of a tapered roller is formed, and a first flat surface in a radial direction is formed in a portion on the outer diameter side from the first conical surface. On an inner diameter side from the mold parting line, a second conical surface which slides in contact with the outer peripheral surface of the tapered roller
(Continued)

is formed, and a second flat surface in a radial direction is formed in a portion on the inner diameter side from the second conical surface.

14 Claims, 20 Drawing Sheets

(51) Int. Cl.
  *F16C 33/66* (2006.01)
  *F16C 19/36* (2006.01)
  *F16C 33/58* (2006.01)
(52) U.S. Cl.
  CPC ........ *F16C 33/4676* (2013.01); *F16C 33/585* (2013.01); *F16C 33/6614* (2013.01); *F16C 33/6651* (2013.01); *F16C 43/06* (2013.01); *F16C 43/065* (2013.01); *F16C 2208/20* (2013.01); *F16C 2220/04* (2013.01); *F16C 2240/34* (2013.01); *F16C 2240/70* (2013.01); *F16C 2300/02* (2013.01); *F16C 2361/61* (2013.01)
(58) Field of Classification Search
  CPC .......... F16C 33/6651; F16C 43/065; F16C 2220/04; F16C 2240/34; F16C 2240/56; F16C 2240/70; F16C 2361/61; Y10T 29/49691
  USPC ................ 384/523, 526, 560–561, 564–565, 384/571–572, 576, 580, 582
  See application file for complete search history.

(56) References Cited

U.S. PATENT DOCUMENTS

| | | | |
|---|---|---|---|
| 3,477,773 A | | 11/1969 | Alton |
| 3,578,828 A | * | 5/1971 | Orkin ...................... F16C 17/10 384/129 |
| 3,733,111 A | | 5/1973 | Harlan et al. |
| 4,065,191 A | | 12/1977 | Kellstrom |
| 4,222,620 A | | 9/1980 | Mirring |
| 4,317,601 A | | 3/1982 | Faigley, Jr. |
| 4,425,011 A | | 1/1984 | Cunningham et al. |
| 4,472,006 A | | 9/1984 | Goransson et al. |
| 4,523,862 A | | 6/1985 | Yasui et al. |
| 5,096,075 A | * | 3/1992 | Glover ...................... B61G 7/10 213/61 |
| 5,267,840 A | * | 12/1993 | Snow ...................... F04C 15/06 417/310 |
| 5,397,184 A | * | 3/1995 | Murai ................. F16C 32/0603 384/107 |
| 5,669,719 A | | 9/1997 | Kinno et al. |
| 6,135,643 A | | 10/2000 | Hattori et al. |
| 6,146,045 A | * | 11/2000 | Maughan .................. F16D 1/12 280/93.508 |
| 6,502,307 B2 | | 1/2003 | Komaba et al. |
| 7,150,565 B1 | | 12/2006 | Koyama et al. |
| 7,722,257 B2 | | 5/2010 | Tabata et al. |
| 7,955,001 B2 | | 6/2011 | Reed et al. |
| 8,083,598 B2 | * | 12/2011 | Yamamoto .............. B60B 27/00 384/544 |
| 8,342,769 B2 | * | 1/2013 | Elterman ............... B62D 7/166 403/136 |
| 8,382,380 B2 | | 2/2013 | Nakamizo et al. |
| 8,636,414 B1 | * | 1/2014 | Van Dyke ........... B60B 27/0026 384/129 |
| 8,766,295 B2 | | 7/2014 | Kim |
| 9,834,038 B2 | * | 12/2017 | Chung .................. B60B 35/125 |
| 2002/0051594 A1 | | 5/2002 | Takehara et al. |
| 2002/0102041 A1 | | 8/2002 | Matsuyama et al. |
| 2005/0069239 A1 | | 3/2005 | Yamamoto et al. |
| 2007/0269157 A1 | | 11/2007 | Fahrni et al. |
| 2008/0096715 A1 | * | 4/2008 | Ono .................... F16H 57/0483 475/160 |
| 2009/0003747 A1 | | 1/2009 | De Mul |
| 2009/0074345 A1 | | 3/2009 | Omoto |
| 2009/0272833 A1 | * | 11/2009 | Wahl ...................... B60R 22/40 242/384.2 |
| 2011/0123143 A1 | | 5/2011 | Lee et al. |
| 2011/0142389 A1 | | 6/2011 | Takeuchi et al. |
| 2012/0306173 A1 | * | 12/2012 | Meitinger .............. B60G 7/006 280/86.751 |
| 2013/0004113 A1 | | 1/2013 | Ueno |

FOREIGN PATENT DOCUMENTS

| | | |
|---|---|---|
| CN | 102072255 A | 5/2011 |
| CN | 202108870 U | 1/2012 |
| CN | 202165427 U | 3/2012 |
| CN | 102834631 A | 12/2012 |
| DE | 102010035062 A1 | 2/2012 |
| DE | 10 2011 004 210 A1 | 8/2012 |
| EP | 1408248 A2 | 4/2004 |
| EP | 1426639 A1 | 6/2004 |
| EP | 1519058 A2 | 3/2005 |
| EP | 2787224 A | 10/2014 |
| GB | 2115889 A | 9/1983 |
| JP | 56-101417 A | 8/1981 |
| JP | 58-165324 U | 11/1983 |
| JP | 59-50224 A | 3/1984 |
| JP | 6196216 A | 5/1985 |
| JP | 63-001055 Y2 | 1/1988 |
| JP | 1-75621 U | 5/1989 |
| JP | 03-089219 U1 | 9/1991 |
| JP | 06-032747 U | 4/1994 |
| JP | 09-4688 A | 1/1997 |
| JP | 2000-130443 A | 5/2000 |
| JP | 2002-48146 A | 2/2002 |
| JP | 3699249 B2 | 9/2005 |
| JP | 2007-24110 A | 2/2007 |
| JP | 2007-032679 A | 2/2007 |
| JP | 2007-40520 A | 2/2007 |
| JP | 2007-127269 A | 5/2007 |
| JP | 2007-255569 A | 10/2007 |
| JP | 2008-163999 A | 7/2008 |
| JP | 2008-180246 A | 8/2008 |
| JP | 2008-291921 A | 12/2008 |
| JP | 2008298230 A | 12/2008 |
| JP | 2010-25155 A | 2/2010 |
| JP | 2010-048342 A | 3/2010 |
| JP | 2010-174918 A | 8/2010 |
| JP | 2012-177429 A | 9/2012 |
| JP | 2012-225492 A | 11/2012 |
| JP | 2012-241873 A | 12/2012 |
| JP | 5397505 A | 11/2013 |
| KR | 20110015672 A | 2/2011 |
| WO | 2010/005007 A1 | 1/2010 |
| WO | 2011/129178 A1 | 10/2011 |
| WO | 2012/031815 A1 | 3/2012 |
| WO | 2013/051422 A1 | 4/2013 |

OTHER PUBLICATIONS

Communication dated Jan. 24, 2017 issued by the State Intellectual Property Office of the People's Republic of China in counterpart Chinese Patent Application No. 201480020018.6.
Communication from United States Patent and Trademark Office dated Aug. 26, 2016 in U.S. Appl. No. 14/652,267.
Communication from United States Patent and Trademark Office dated Dec. 2, 2016 in U.S. Appl. No. 14/652,267.
Communication from United States Patent and Trademark Office dated Sep. 9, 2016 in U.S. Appl. No. 14/652,267.
Communication dated Feb. 16, 2016, issued by the European Patent Office in counterpart European Patent Application No. 13868365.1.
Communication dated Jun. 10, 2016, issued by the Korean Intellectual Property Office in counterpart Korean Patent Application No. 10-2015-7016572.
Communication dated Jun. 28, 2016, issued by the Japanese Patent Office in counterpart Japanese Patent Application No. 2013-267846.
Communication dated Sep. 9, 2016 by the Chinese Patent Office in counterpart Chinese Patent Application No. 201380059649.4.

(56) References Cited

OTHER PUBLICATIONS

International Search Report dated Mar. 11, 2014, issued by the International Searching Authority in counterpart International Application No. PCT/JP2013/084751.
Morton; Hudson, T. "Anti-Friction Bearings", Second Edition, p. 222-223.
Office Action dated Feb. 16, 2016, issued by the European Patent Office in counterpart European Patent Application No. 14780378.7.
Search Report dated Jul. 1, 2014, issued by the International Searching Authority in counterpart International Application No. PCT/JP2014/059939.
Written Opinion dated Jul. 1, 2014, issued by the International Searching Authority in counterpart International Application No. PCT/JP2014/059939.
Written Opinion dated Mar. 11, 2014 issued by the International Searching Authority in counterpart International Application No. PCT/JP2013/084751.
Communication issued by the Japanese Patent Office dated Oct. 24, 2017 in counterpart Japanese Patent Application No. 2013-267847.

\* cited by examiner

RESIN CAGE FOR TAPERED ROLLER BEARING AND TAPERED ROLLER BEARING INCLUDING THE RESIN CAGE

CROSS REFERENCE TO RELATED APPLICATIONS

This is a continuation of abandoned application Ser. No. 14/781,804, filed Oct. 1, 2015, which is a 371 of International Application Serial No. PCT/JP2014/059939, filed Apr. 4, 2014, which claims priority from Japanese Patent Application Serial No. 2013-078999, filed Apr. 4, 2013, and Japanese Patent Application Serial No. 2013-079000, filed Apr. 4, 2013, all of which are incorporated herein by reference.

TECHNICAL FIELD

The present invention relates to a cage which is used for a tapered roller bearing and is manufactured by injection-molding a thermoplastic resin, and a tapered roller bearing which is provided with the cage, and particularly relates to a cage and a tapered roller bearing which can be suitably used to a motor vehicle, a railway vehicle, a construction machine, a joint of an industrial robot, a machine tool, a transport device, an assembly device, and the like.

BACKGROUND ART

A roller bearing has a large load capacity of a radial load compared to a ball bearing, and a tapered roller bearing in which a roller having a circular truncated cone shape (a tapered roller) is assembled as a rolling element can support a combined load of a radial load and an axial (thrust) load. For this reason, the tapered roller bearing has been widely used for a rotating support portion in a driving device, a gear reducer, and a power transmitting device in various machines such as a motor vehicle, a railway vehicle, a construction machine, a machine tool, and an industrial robot (for example, refer to Patent Document 1).

As a cage used in the tapered roller bearing, a resin cage which is made by injection-molding a thermoplastics resin with which a reinforcing material such as a glass fiber or a carbon fiber is filled has been widely used since the resin cage is excellent in lightness and mass productivity and has no metallic abrasion powders generated compared with a metal cage which is made by press-forming a steel plate. In addition, in order to reduce manufacturing cost, the resin cage is generally injection-molded by using a molding structure in which a pair of molds are separated from each other in the axial direction, that is, by using an axial-draw molding (for example, refer to paragraph [0011] and FIG. 11 in Patent Document 1).

In the cage which is injection-molded by using such an axial-draw molding, on the basis of a mold parting line in a pocket as a boundary, one side is in contact with the tapered roller and the other side is not in contact with the tapered roller. Thus, the tapered roller can be inserted into the cage from the inner diameter side, and is not dropped out to the outer diameter side, but is dropped out to the inner diameter side. Therefore, since the tapered roller is likely to be dropped out with only the cage and the tapered roller, the productivity of the tapered roller bearing deteriorated depending on a configuration of an assembly line.

In addition, in order to improve the productivity of the tapered roller bearing, there has been proposed a resin cage for a tapered roller bearing which has a shape realizing a so-called cage and roller wherein the cage can support the tapered roller while holding the tapered roller in a state where the tapered roller bearing is not assembled between the inner ring and the outer ring (for example, refer to Patent Documents 2 and 3).

PRIOR ART DOCUMENT

Patent Document

Patent Document 1: JP-A-2007-127269
Patent Document 2: JP-B-3699249
Patent Document 3: JP-A-2007-32679

SUMMARY OF THE INVENTION

Problem to be Solved

Since a resin cage for a tapered roller bearing disclosed in Patent Document 2 can realize the cage and roller, the tapered roller bearing is easily assembled, for example, an assembly can be easily performed by an automatic machine. Concurrently, in order to realize the cage and roller, an inside protruding portion, which protrudes to an inner diameter side from annular portions at both ends so as to prevent the tapered roller from being dropped out to the inner diameter side, is formed in a pillar portion between adjacent pockets. For this reason, this cage cannot be injection-molded by using an axial-draw molding, and therefore, it is required to perform injection-molding by using a molding structure, that is, a radial draw molding which displaces a number of molds in the radial direction. Due to this, molds are complicated and expensive and thus a manufacturing cost becomes increased.

In addition, in the tapered roller bearing disclosed in Patent Document 3, a projection for preventing the escape of tapered rollers is provided at an opening edge of an outer peripheral side and an inner peripheral side of a pocket, and there is a possibility that the injection-molding cannot be performed by using an axial-draw molding machine, thereby increasing manufacturing cost. In addition, in Patent Document 3, the roller insertability with respect to the cage was not examined. Further, the cage which is used for the tapered roller bearing disclosed in Patent Document 3 is integrally formed with the roller, but since an overlap allowance (interference) for holding tapered rollers is not described, it is not clear that the properties for holding tapered rollers are sufficient.

The present invention was made in consideration of the above-described circumstance, and an object thereof is to provide a resin cage for a tapered roller bearing which has a shape realizing a so-called cage and roller and can be formed by injection-molding and a tapered roller bearing including the resin cage.

Means for Solving the Problem

The above object of the present invention is achieved by the following configurations.
(1) A resin cage for a tapered roller bearing that is injection-molded such that a large-diameter ring portion and a small-diameter ring portion which are separated from each other in an axial direction are connected to each other by a plurality of pillar portions which come in slide contact with an outer peripheral surface of a tapered roller which is a rolling element, and a plurality of pockets are equally formed in a circumferential direction for housing and holding the tapered roller, wherein a mold parting line which is extended in an axial direction is formed in the pillar portion defining the pockets, wherein on facing surfaces of the adjacent pillar portions, on an outer diameter side from the mold parting line, a first conical surface which comes in slide contact with an outer peripheral surface of the tapered roller is formed, and a substantially flat surface in a first radial direction which is continuous to the first conical surface is formed in a portion on the outer diameter side from the first conical surface, and wherein on an inner diameter side from the mold parting line, a second conical surface which comes in slide contact with an outer peripheral surface of the tapered roller is formed, and a substantially flat surface in a second radial direction which is continuous to the second conical surface is formed in a portion on the inner diameter side from the second conical surface.

(2) The resin cage for a tapered roller bearing according to (1), wherein the large-diameter ring portion, the small-diameter ring portion, and the pillar portion of the cage are molded by extracting a pair of moldings in the axial direction.

(3) The resin cage for a tapered roller bearing according to (1), wherein a recessed groove along the mold parting line is formed on the facing surface of the pillar portion.

(4) The resin cage for a tapered roller bearing according to (3), wherein a depth of recessed groove is within a range of 0.1 mm to 0.8 mm.

(5) The resin cage for a tapered roller bearing according to (4), wherein a boundary between the first conical surface and the substantially flat surface in the first radial direction, and a boundary between the second conical surface and the substantially flat surface in the second radial direction correspond to each other, and wherein the depth of the recessed groove is within a range of 0.1 mm to 0.6 mm in the vicinity of an intersection position of the boundary and the mold parting line.

(6) The resin cage for a tapered roller bearing according to any one of (1) to (5), wherein the mold parting line is formed substantially in a center portion of the pillar portion in the radial direction such that the first conical surface and the second conical surface are substantially the same as each other in an extension length of the pillar portion.

(7) The resin cage for a tapered roller bearing according to any one of (1) to (5), wherein the pillar portion is formed such that an opening width on an inner diameter in the pocket is smaller than a large roller diameter of the tapered roller by setting at least a portion on the inner diameter side of the pocket as an overlap allowance of 0.2 mm to 0.7 mm, and the pillar portion is formed such that an opening width on an outer diameter in the pocket is smaller than a small roller diameter of the tapered roller by setting at least a portion on the outer diameter side of the pocket as an overlap allowance from 0.1 mm to 0.5 mm.

(8) The resin cage for a tapered roller bearing according to any one of (1) to (5), wherein an annular notch portion is formed on at least one of an inner peripheral surface of the large-diameter ring portion and an outer peripheral surface of the small-diameter ring portion of the cage in such that a thickness of the ring portion is smaller than a thickness of the pillar portion.

(9) The resin cage for a tapered roller bearing according to (7), wherein an annular notch portion is formed on at least one of an inner peripheral surface of the large-diameter ring portion and an outer peripheral surface of the small-diameter ring portion of the cage such that a thickness of the ring portion is smaller than a thickness of the pillar portion.

(10) The resin cage for a tapered roller bearing according to (8), wherein the notch portion is formed on the inner peripheral surface of the large-diameter ring portion, wherein a thickness of the large-diameter ring portion is 40% to 80% of a thickness of the pillar portion, and wherein the thickness of the pillar portion is 30% to 70% of an averaged roller diameter of the tapered roller.

(11) The resin cage for a tapered roller bearing according to any one of (1) to (5), wherein an inclination angle of the cage is set to be equal to or greater than 32°30' and less than 55°.

(12) The resin cage for a tapered roller bearing according to (7), wherein an inclination angle of the cage is set to be equal to or greater than 32°30' and less than 55°.

(13) The resin cage for a tapered roller bearing according to (8), wherein an inclination angle of the cage is set to be equal to or greater than 32°30' and less than 55°.

(14) The resin cage for a tapered roller bearing according to (9), wherein an inclination angle of the cage is set to be equal to or greater than 32°30' and less than 55°.

(15) The resin cage for a tapered roller bearing according to (10), wherein an inclination angle of the cage is set to be equal to or greater than 32°30' and less than 55°.

(16) A resin cage for a tapered roller bearing that is injection-molded using an axial-draw molding such that a large-diameter ring portion and a small-diameter ring portion which are separated from each other are connected to each other in an axial direction by a plurality of pillar portions which come in slide contact with an outer peripheral surface of a tapered roller which is a rolling element, and a plurality of pockets are equally formed in a circumferential direction for housing and holding the tapered roller, wherein a mold parting line which is extended in an axial direction is formed in the pillar portion defining the pockets, wherein on facing surfaces of the adjacent pillar portions, on an outer diameter side from the mold parting line, a conical surface on the inner diameter side which comes in slide contact with an outer peripheral surface of the tapered roller is formed in a portion on the inner diameter side from a virtual conical surface connecting to a respective rotation axes of the plurality of tapered rollers, and a flat surface in a radial direction which is continuous to the conical surface on the inner diameter side is formed in a portion on the outer diameter side from the virtual conical surface, and wherein on an inner diameter side from the mold parting line, a conical surface on the outer diameter side which comes in slide contact with an outer peripheral surface of the tapered roller is formed in a portion on the outer diameter side from the virtual conical surface, and a flat surface in a radial direction which is continuous to the conical surface on the outer diameter side is formed in a portion on the inner diameter side from the virtual conical surface.

(17) The resin cage for a tapered roller bearing according to (16), wherein a recessed groove along the mold parting line is formed on the facing surface of the pillar portion.

(18) The resin cage for a tapered roller bearing according to (16) or (17), wherein the mold parting line is formed in a center portion of the pillar portion in the radial direction such that the conical surface on the inner diameter side and the conical surface on the outer diameter side are the same as each other in a extension length of the pillar portion.

(19) A tapered roller bearing comprising:

an outer ring which includes an outer ring raceway surface on an inner peripheral surface;

an inner ring which includes an inner ring raceway surface on an outer peripheral surface;

a plurality of tapered rollers which are rollably arranged between the outer ring raceway surface and the inner ring raceway surface; and the resin cage according to any one of (1) to (17), wherein a flange is formed at an end portion on a large-diameter side of the inner ring, the inner ring raceway surface is provided to be continuous to an end surface of a small-diameter side of the inner ring, and a contact angle α of the tapered roller bearing is set to be within a range of 37°30' to 50°.

(20) A tapered roller bearing comprising:

an outer ring which includes an outer ring raceway surface on an inner peripheral surface;

an inner ring which includes an inner ring raceway surface on an outer peripheral surface;

a plurality of tapered rollers which are rollably arranged between the outer ring raceway surface and the inner ring raceway surface; and the resin cage according to any one of (1) to (17), wherein a flange is formed only at an end portion on a large-diameter side among an end portion on the large-diameter side and an end portion on a small-diameter side of the inner ring, and a contact angle α of the tapered roller bearing is set to be within a range of 37°30' to 50°.

(21) The tapered roller bearing according to (19) or (20), wherein a flat surface or a recessed portion which faces a notch portion of the cage is formed in the flange, and thus the flange is formed into a shape of entering the notch portion.

It is noted that the "radially flat surface" in the present invention is not limited to the flat surface extending in the radial direction or the flat surface in which the facing surfaces parallel to each other, but may be a flat surface facing the radial direction so as to extract the mold to the axial direction.

Effects of the Invention

As described above, according to the resin cage for tapered roller bearing, since the conical surfaces which come in slide contact with the outer peripheral surface of the tapered roller and the substantially radially flat surfaces are alternately formed on the facing surfaces of the adjacent pillar portions by being separated to the outer diameter side and the inner diameter side from the mold parting line, the tapered roller is held by the conical surface which is positioned on the outer diameter side from the mold parting line and the conical surface which is positioned on the inner diameter side from the mold parting line. Therefore, the tapered rollers can be held in a state where the tapered roller bearing is not assembled between the inner ring and the outer ring. Accordingly, with such a cage and roller, it is possible to facilitate the assembly of the tapered roller bearing, for example, the assembly can be easily performed by an automatic machine.

DETAILED DESCRIPTION OF EMBODIMENTS

Hereinafter, a tapered roller bearing according to each embodiment of the present invention will be described in detail with reference to the drawings.

First Embodiment

Figure 1A:
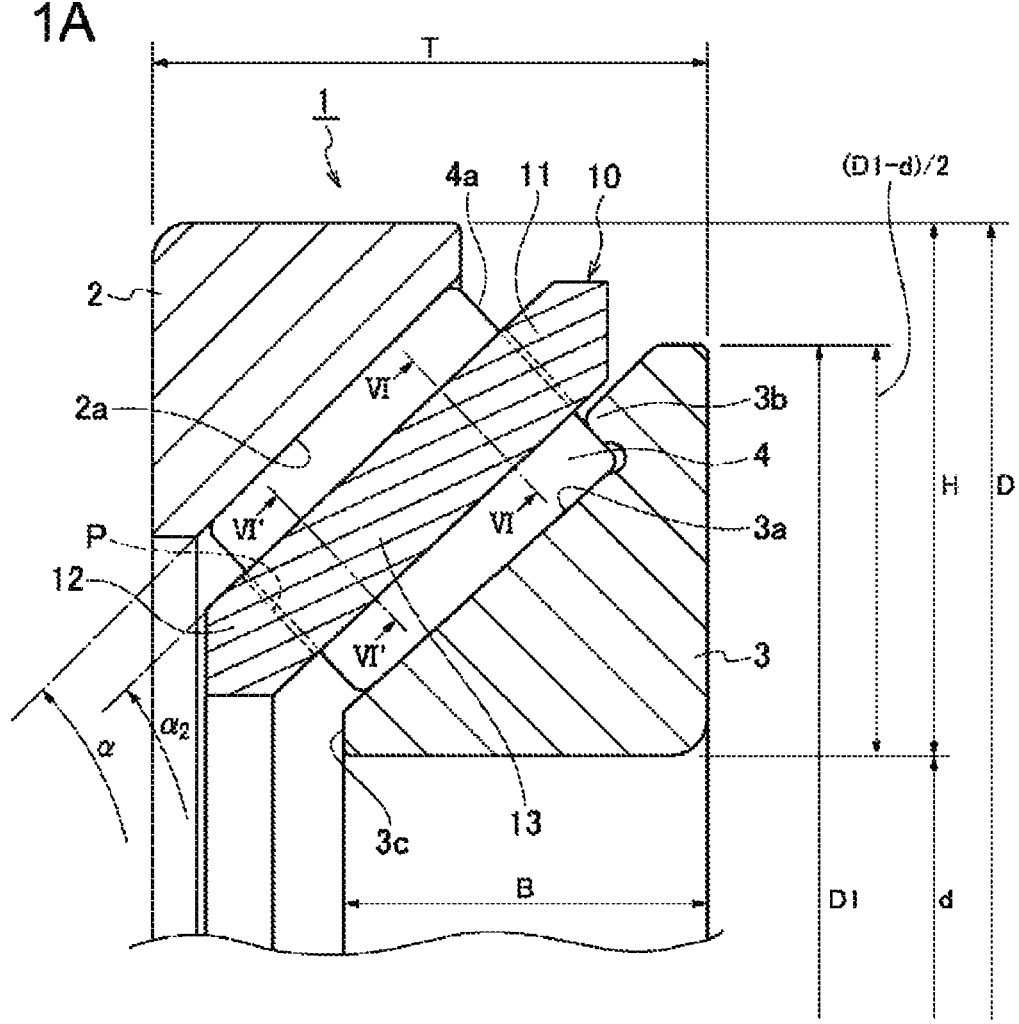
FIG. 1A is a sectional view of a tapered roller bearing according to a first embodiment of the present invention.
Figure 1B:
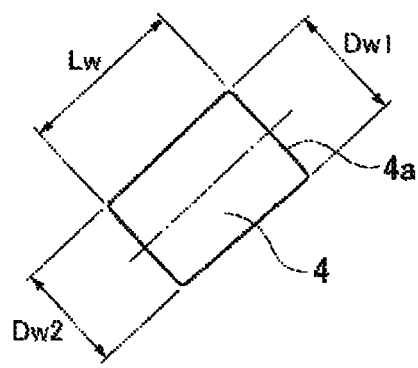
FIG. 1B is a view of a tapered roller.
Figure 2:
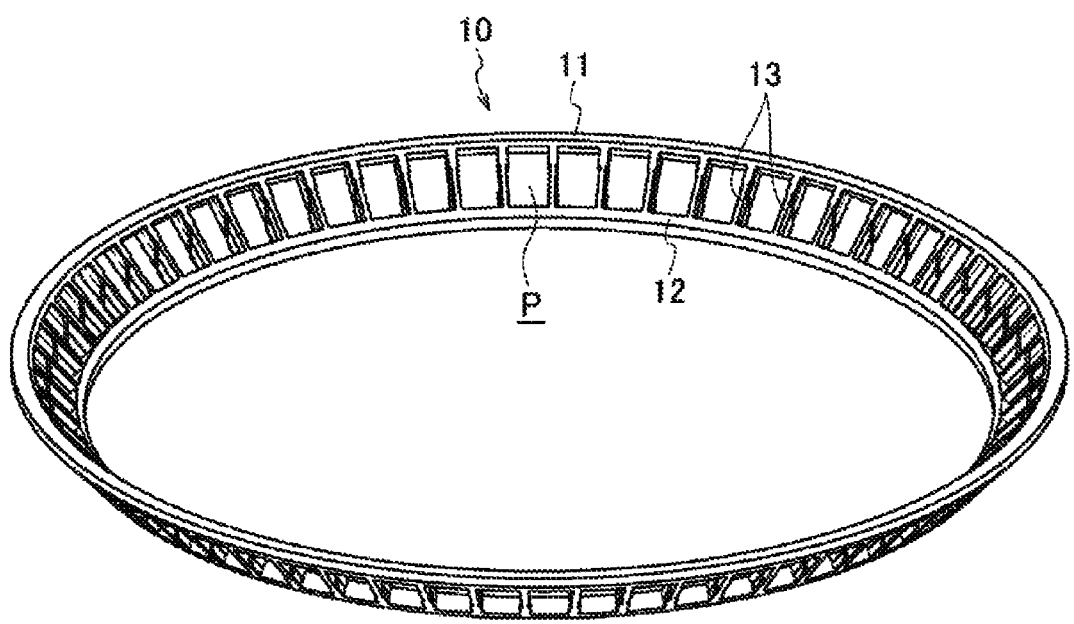
FIG. 2 is a perspective view of a resin cage for the tapered roller bearing in FIG. 1.

As illustrated in FIGS. 1A and 1B, a tapered roller bearing 1 in the first embodiment includes an outer ring 2 having an outer ring raceway surface 2a on an inner peripheral surface, an inner ring 3 having an inner ring raceway surface 3a on an outer peripheral surface, a plurality of tapered rollers 4 which are rollably arranged between the outer ring raceway surface 2a and the inner ring raceway surface 3a, and a resin cage 10 which defines a plurality of pockets P for housing and holding the plurality of tapered rollers 4 at a predetermined interval.

The outer ring raceway surface 2a which is formed on the outer ring 2 is provided on an inner peripheral surface of the outer ring 2 such that an inner diameter becomes gradually larger toward a large-diameter side from a small-diameter side.

In addition, the inner ring 3 is provided with a large flange 3b which is formed at an end portion on a large-diameter side so as to project to the outside in the radial direction, and the inner ring raceway surface 3a is provided to be continuous to an end surface of a small-diameter side 3c, and to make the outer diameter become gradually larger toward the large flange 3b from the end surface of the small-diameter side 3c. That is, the inner ring 3 includes a flange portion only at the end portion on the large-diameter side among the end portion on the large-diameter side and the end portion of the small-diameter side.

As illustrated in FIGS. 1A and 1B, in the tapered roller bearing 1 in the present embodiment, a contact angle α which is an angle formed of a contact line of the outer ring raceway surface 2a and a rotation axis of the tapered roller bearing 1 is set to be 45° so as to improve the moment rigidity. Meanwhile, when the contact angle α is within a range of 37°30' to 50°, it is possible to improve the moment rigidity. When a pair of the tapered roller bearings 1 are used by being disposed in the axial direction, a distance between bearings is short, that is, in a case where the distance between the bearings is equal to or smaller by four times than an assembly width T of the bearing, when the contact angle α is set to be in a range of 37°30' to 50°, it is possible to make the distance between points of load application longer, which is particularly effective in improving the moment rigidity of the bearing.

In addition, as illustrated in FIGS. 1A to 3, the resin cage 10 includes a large-diameter ring portion 11 and a small-diameter ring portion 12 which are apart from each other in the axial direction, and a plurality of pillar portions 13 which connect between the large-diameter ring portion 11 and the small-diameter ring portion 12, and are provided at a predetermined interval in the circumferential direction. The pillar portion 13 comes in slide contact with the outer peripheral surface of the tapered roller 4 which is a rolling element. In the resin cage 10, a plurality of pockets P, P, . . . are equally formed in a circumferential direction for housing and holding the tapered rollers 4, 4, . . . .

As a base resin which is used in a usable resin composition for the cage 10, it is possible to use a thermoplastics resin having a certain or higher level of heat resisting properties. In addition, in order to satisfy a fatigue resistance which is required for the cage 10 and less dimensional change of water absorption, a crystalline resin is preferable, such as polyamide 46, polyamide 66, an aromatic polyamide resin, a polyphenylene sulfide (PPS) resin, and a polyether ether ketone (PEEK) resin. Examples of the aromatic polyamide resin include modified polyamide 6T, polyamide MXD6, polyamide 9T, and polyamide 4T such as polyamide 6T/6I. Among the base resins described above, the polyphenylene sulfide (PPS) resin and the polyether ether ketone (PEEK) resin in which there is almost no dimensional change due to water absorption are particularly preferred.

In addition, this resin composition includes a reinforcing fiber material in order to achieve a certain level of strength, and prevent the coefficient of linear expansion and water absorption dimension from changing. As an example of the reinforcing fiber material, it is preferable to use a surface-treated product (adhesiveness with the base resin is improved by performing surface treatment by using a silane coupling agent and a sizing agent) such as a glass fiber, a carbon fiber, and an aramid fiber. The content of the reinforcing fiber material in the resin composition is preferably from 10% by weight to 40% by weight with respect to the entire resin composition, and is more preferably from 15% by weight to 30% by weight.

The resin cage 10 is made by injection-molding, and in the present embodiment, is made by injection-molding by using the axial-draw molding that is advantageous in cost.

Figure 5:
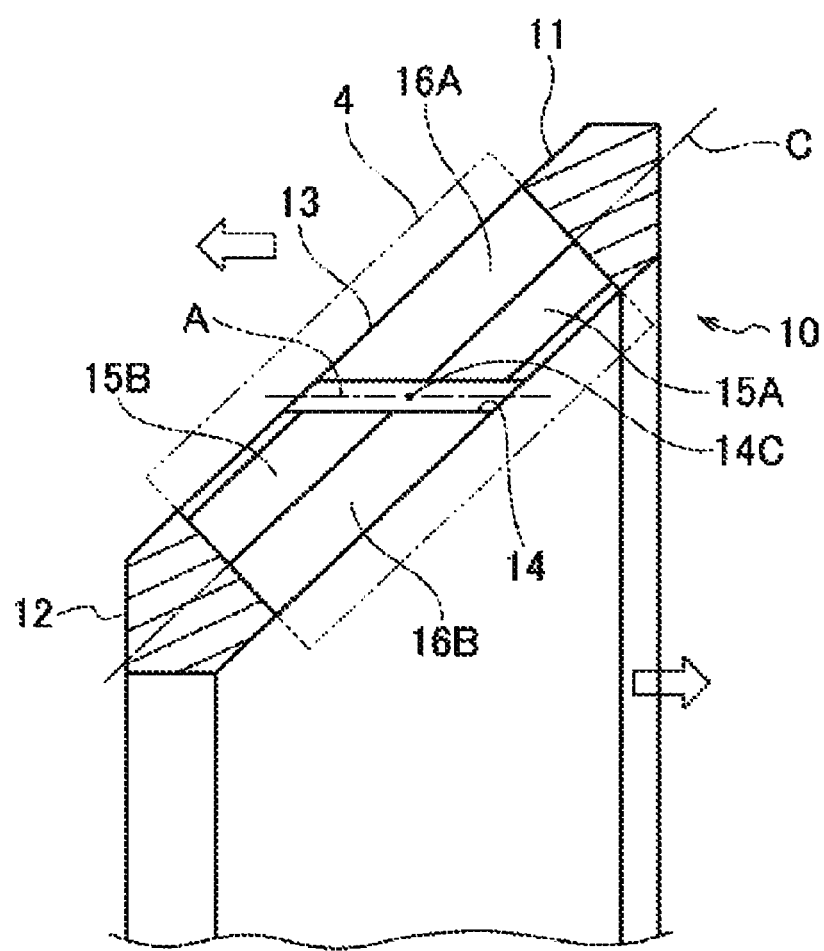
FIG. 5 is an enlarged front longitudinal sectional view of a main part of the resin cage for the tapered roller bearing in FIG. 1.

Then, as illustrated in FIG. 5, since the center portion of the pillar portions 13, 13, . . . which define the pockets P, P, . . . in the radial direction is set to be the mold parting line, that is, a parting line A, the pockets P, P, . . . are formed by combining a fixed side cavity and a movable side cavity.

Figure 3:
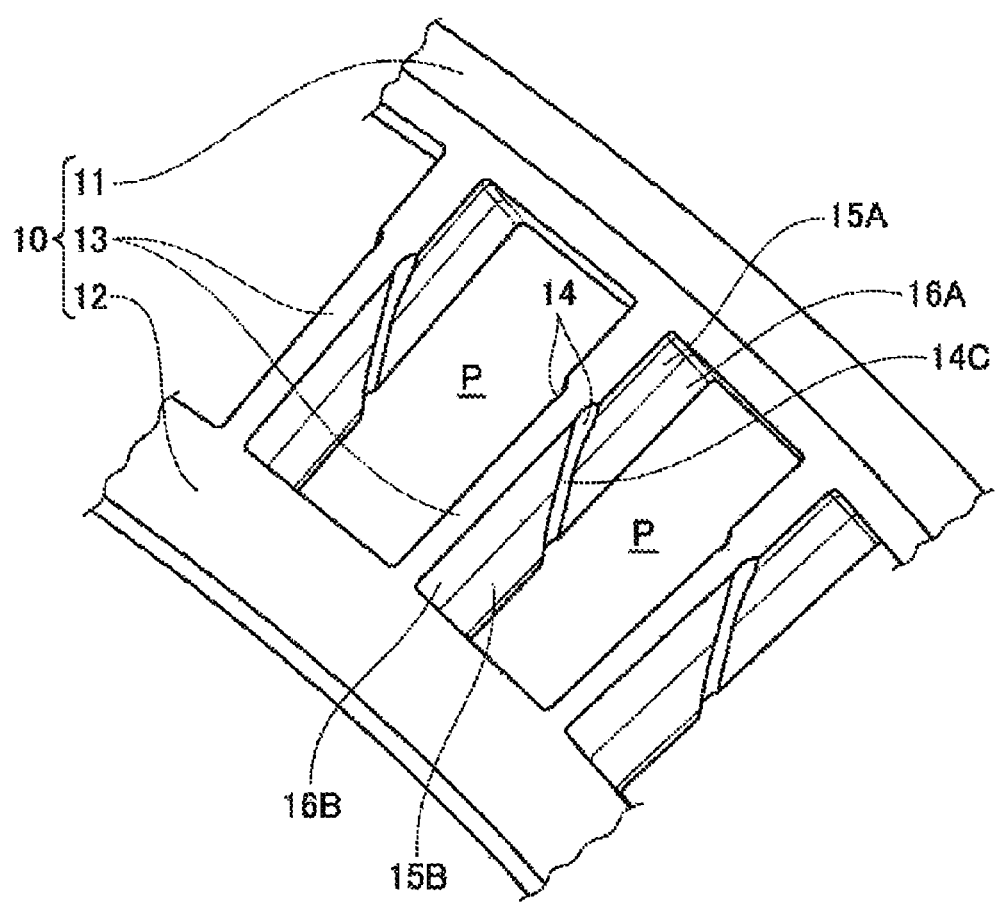
FIG. 3 is an enlarged perspective view of a main part of the resin cage for the tapered roller bearing in FIG. 1.
Figure 4:
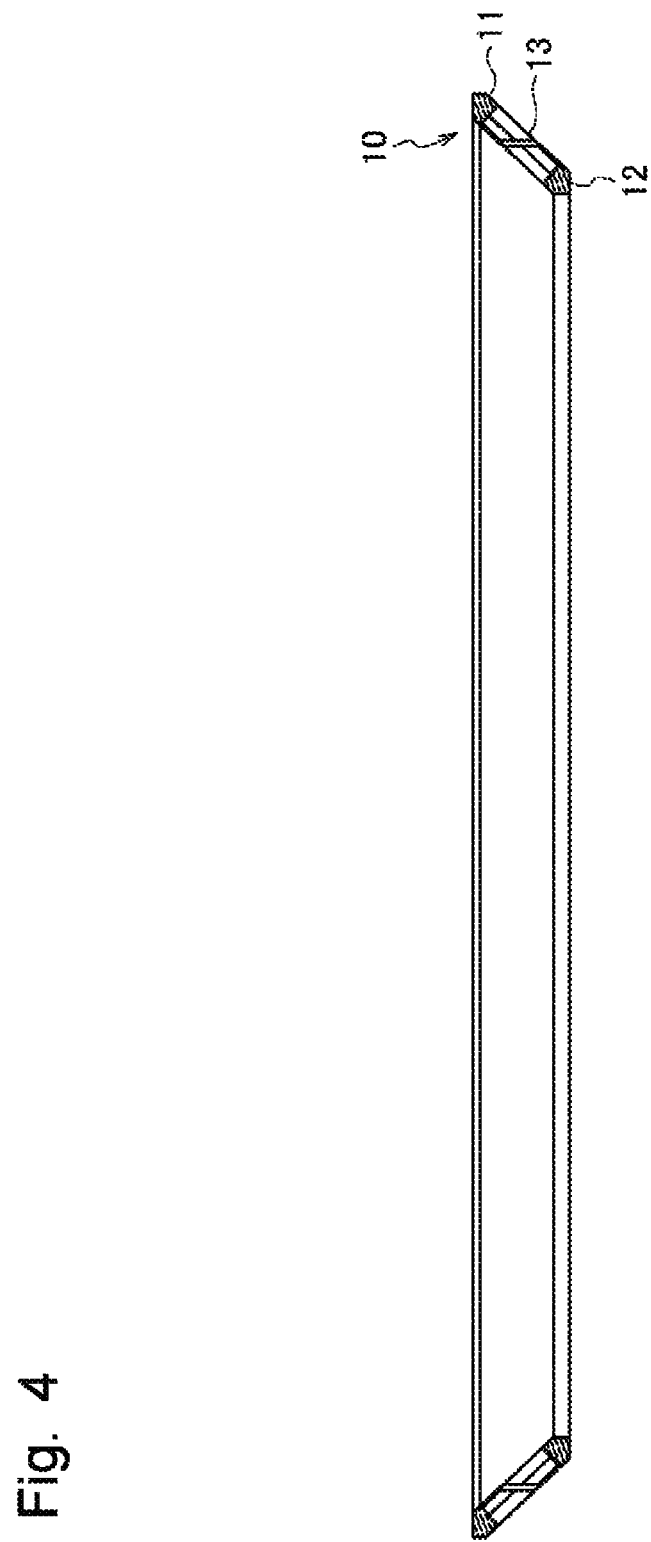
FIG. 4 is a front longitudinal sectional view of the resin cage for the tapered roller bearing in FIG. 1.

As illustrated in FIGS. 3 and 5, on the outer diameter side from the mold parting line A on the facing surfaces of the adjacent pillar portions 13, 13, a conical surface 15A on the inner diameter side which comes in slide contact with the outer peripheral surface of the tapered roller 4 is formed on the inner diameter side from an virtual conical surface C connecting each of rotation axes (central axis) of a plurality of tapered rollers 4, 4, and a radially flat surface 16A which is continuous to the conical surface 15A on the inner diameter side is formed on the outer diameter side from the virtual conical surface C. In addition, on the inner diameter side from the mold parting line A on the facing surfaces of the adjacent pillar portions 13, 13, a conical surface 15B on the outer diameter side which comes in slide contact with the outer peripheral surface of the tapered roller 4 is formed on the outer diameter side from the virtual conical surface C, and a radially flat surface 16B which is continuous to the conical surface 15B on the outer diameter side is formed on the inner diameter side from the virtual conical surface C. Meanwhile, curvatures of the conical surfaces 15A, 15B are set to be greater than the curvature of the tapered roller 4.

Further, the recessed grooves 14, 14 along the mold parting line A are formed on the facing surfaces of the adjacent pillar portions 13, 13.

According to such a configuration, since the conical surfaces 15A, 15B which come in slide contact with the outer peripheral surface of the tapered roller 4 and the radially flat surfaces 16A, 16B are alternately formed on the facing surfaces of the adjacent pillar portions 13, 13 by being separated to the outer diameter side and the inner diameter side from the mold parting line A, the tapered roller 4 is held by the conical surface 15A which is positioned on the outer diameter side from the mold parting line A and the conical surface 15B which is positioned on the inner diameter side from the mold parting line A. Therefore, the tapered rollers 4, 4, . . . can be held in a state where the tapered roller bearing is not assembled between the inner ring and the outer ring. Accordingly, with such a cage and roller, it is possible to facilitate the assembly of the tapered roller bearing, for example, the assembly can be easily performed by an automatic machine.

In addition, since there is no need to form the inside protruding portion, which is disclosed in Patent Document 2, for preventing the tapered roller from being dropped out to the inner diameter side, the conical surfaces 15A, 15B which come in slide contact with the outer peripheral surface of the tapered roller 4 and the radially flat surfaces 16A, 16B are alternately formed on the facing surfaces of the adjacent pillar portions 13, 13 by being separated to the outer diameter side and the inner diameter side from the mold parting line A, and thus it is possible to extract the molding in the axial direction as illustrated by an arrow in FIG. 5, thereby performing the injection-molding by using the axial-draw molding. Accordingly, since the mold is not complicated and is not expensive, a manufacturing cost of the resin cage 10 for a tapered roller bearing is not increased.

Further, since the recessed groove 14, 14, . . . along the mold parting line A is formed in the pillar portions 13, 13, . . . which define the pockets P, P, . . . , even when a burr occurs due to the mold parting line A in the pocket P, the burr which can be stored in the recessed groove 14 does not interfere with the tapered roller 4. Therefore, it is possible to allow the burr having a size which can be stored in the recessed groove 14. Accordingly, it is possible to significantly reduce a risk that the tapered roller and the raceway surfaces in the inner ring and the outer ring are damaged because the burr is dropped out from the cage 10 during the rotation of the tapered roller bearing, and a risk of inhibiting the smooth rotation of the tapered roller 4.

In addition, the mold parting line A is formed in the center portion of the pillar portion 13 in the radial direction such that the conical surface 15A on the inner diameter side and the conical surface 15B on the outer diameter side are extended by the same length from the pillar portion 13. Due to this, it is possible to reliably prevent the tapered roller 4 from being dropped out to the inner diameter side and the outer diameter side by the conical surface 15A on the inner diameter side and the conical surface 15B on the outer diameter side. Meanwhile, the mold parting line A is preferably at the center portion of the pillar portion 13 in the radial direction, but as long as it is possible to reliably prevent the tapered roller 4 from being dropped out by the conical surface 15A on the inner diameter side and the conical surface 15B on the outer diameter side, the mold parting line A may be in the vicinity of the center portion of the pillar portion 13 in the radial direction, that is, may be formed by slightly being deviated from the center portion in the radial direction to the inner diameter side or the outer diameter side.

Figure 6A:
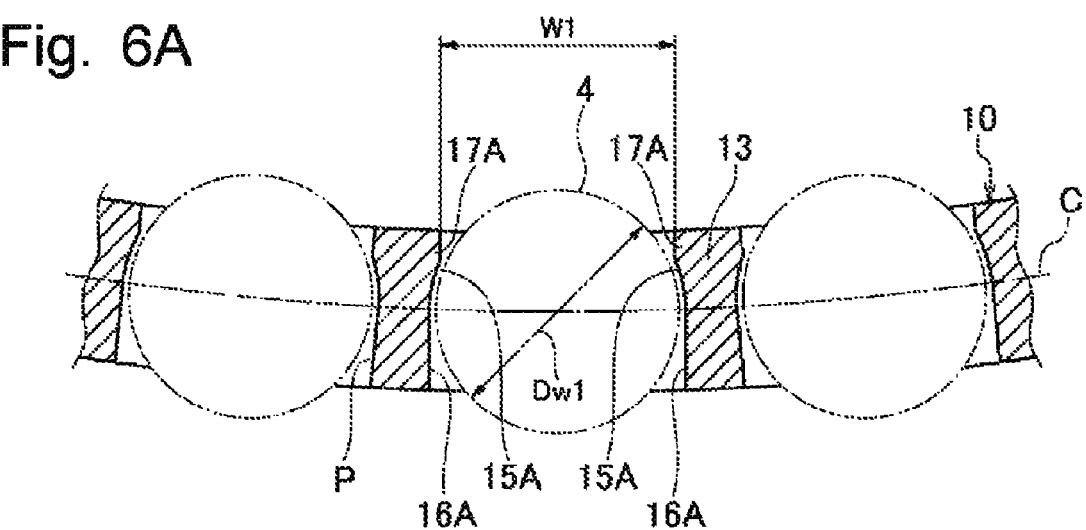
FIG. 6A is a sectional view taken along line VI-VI in FIG. 1.
Figure 6B:
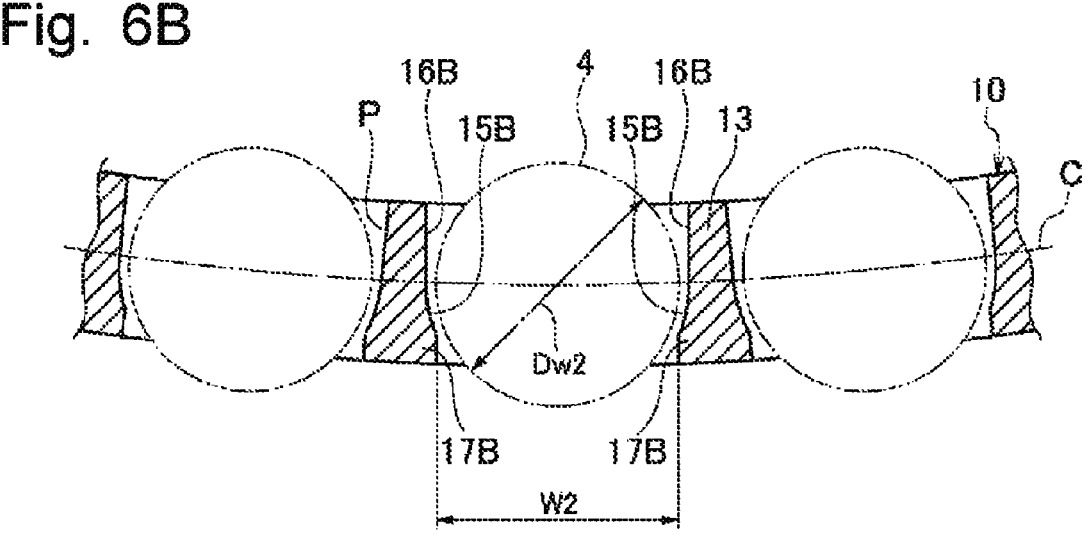
FIG. 6B is a sectional view taken along line VI'-VI' in FIG. 1.

In addition, as illustrated in FIG. 6A, the protruding portion 17A is provided at the end portion of the conical surface 15A on the inner diameter side which is formed in a portion which is close to the large-diameter ring portion of the pillar portion 13, and as illustrated in FIG. 6B, the protruding portion 17B is provided at the end portion of the conical surface 15B on the outer diameter side which is formed in a portion which is close to the small-diameter ring portion of the pillar portion 13.

In addition, in order to assemble the tapered roller 4 and the resin cage 10, in the protruding portion 17A which is close to the large-diameter ring portion of the pillar portion 13, an opening width W1 on the inner diameter in the pocket P is smaller than a roller diameter Dw1 on a large-diameter side, and in the protruding portion 17B which is close to the small-diameter ring portion of the pillar portion 13, an opening width W2 on the outer diameter of the pocket is smaller than a roller diameter Dw2 on a small-diameter side.

Table 1 shows a test result of the roller insertability and the roller retaining performance by changing the overlap allowance (Dw1−W1) in the protruding portion 17A which is close to the large-diameter ring portion of the pillar portion 13 and the overlap allowance (Dw2−W2) in the protruding portion 17B which is close to the small-diameter ring portion of the pillar portion 13 for every 0.1 mm within a range of 0.1 mm to 0.7 mm. It is noted that, other conditions of the test are set to be the same. In addition, in the Table, a double circle indicates that both the roller insertability and the roller retaining performance are good, a single circle indicates that either the roller insertability or the roller retaining performance is not as good as a case of the double circle, but is implementable, and a blank column indicates that the test is not performed.

From this result, it is found that the overlap allowance (Dw1−W1) in the protruding portion 17A which is close to the large-diameter ring portion of the pillar portion 13 is preferably set to be in a range of 0.2 mm to 0.7 mm, and the overlap allowance (Dw2−W2) in the protruding portion 17B which is close to the small-diameter ring portion of the pillar portion 13 is preferably set to be in a range of 0.1 mm to 0.5 mm. Particularly, from a viewpoint of a good balance between the roller insertability and the roller retaining performance, it is preferable that the overlap allowance (Dw1−W1) in the protruding portion 17A which is close to the large-diameter ring portion of the pillar portion 13 is set to be within a range of 0.2 mm to 0.6 mm, and the overlap allowance (Dw2−W2) in the protruding portion 17B which is close to the small-diameter ring portion of the pillar portion 13 is set to be within a range of 0.1 mm to 0.3 mm.

TABLE 1

| | Overlap allowance (mm) | | | | | | |
|---|---|---|---|---|---|---|---|
| | 0.1 | 0.2 | 0.3 | 0.4 | 0.5 | 0.6 | 0.7 |
| Protruding portion 17A close to large-diameter ring | | ◎ | ◎ | ◎ | ◎ | ○ | ○ |
| protruding portion 17B close to small-diameter ring | ◎ | ◎ | ◎ | ○ | ○ | | |

In addition, as illustrated in FIGS. 1A and 1B, an inclined angle $\alpha_2$ of the outer peripheral surface of the cage 10 with respect to the rotation axis of the tapered roller bearing 1 is set to be 32°30′ or greater and smaller than 55°, and is preferably set to be from 32°30′ to 54° to correspond to the contact angle $\alpha$ of the tapered roller bearing 1.

As described above, according to the resin cage 10 for a tapered roller bearing in the present embodiment, since the conical surfaces 15A, 15B which come in slide contact with the outer peripheral surface of the tapered roller 4 and the radially flat surfaces 16A, 16B are alternately formed on the facing surfaces of the pillar portions 13 which are adjacent to each other by being separated to the outer diameter side and the inner diameter side from the mold parting line A, and the tapered roller 4 is held by the conical surface 15A which is positioned on the outer diameter side from the mold parting line A and the conical surface 15B which is positioned on the inner diameter side from the mold parting line A, and the cage can support the tapered roller 4 while holding the tapered roller in a state where the tapered roller bearing is not assembled between the inner ring and the outer ring. Accordingly, with such a cage and roller, it is possible to facilitate the assembly of the tapered roller bearing, for example, the assembly can be easily performed by an automatic machine.

In addition, according to the present embodiment, since there is no need to form the inside protruding portion, which is disclosed in Patent Document 2, for preventing the tapered roller from being dropped out to the inner diameter side, the conical surfaces 15A, 15B which come in slide contact with the outer peripheral surface of the tapered roller 4 and the radially flat surfaces 16A, 16B are alternately formed on the facing surfaces of the adjacent pillar portions 13, by being separated to the outer diameter side and the inner diameter side from the mold parting line A, and thus it is possible to extract a pair of moldings in the axial direction, thereby injection-molding the large-diameter ring portion 11, the small-diameter ring portion 12, and the pillar portion 13 by using the axial-draw molding. Accordingly, since the mold is not complicated and is not expensive, a manufacturing cost of the resin cage 10 for a tapered roller bearing is not increased.

Meanwhile, the cage 10 in the present embodiment is not necessarily injection-molded with the axial-draw molding by using a pair of moldings, but may be injection-molded by partially using an insert or a core.

In addition, since the recessed groove 14 along the mold parting line A is formed on the facing surfaces of the pillar portion 13, even when a burr occurs due to the mold parting line A in the pocket P, the burr which can be stored in the recessed groove 14 does not interfere with the tapered roller 4. Therefore, it is possible to allow the burr having a size which can be stored in the recessed groove 14. Accordingly, it is possible to significantly reduce a risk that the tapered roller 4 and the raceway surfaces in the inner ring and the outer ring are damaged because the burr is dropped out from the cage 10 during the rotation of the tapered roller bearing, and a risk of inhibiting the smooth rotation of the tapered roller 4.

In addition, the mold parting line A is formed in the center portion of the pillar portion 13 in the radial direction such that the conical surface 15A on the inner diameter side and the conical surface 15B on the outer diameter side are extended by the same length from the pillar portion 13. Due to this, it is possible to reliably prevent the tapered roller 4 from being dropped out to the inner diameter side and the outer diameter side by the conical surface 15A on the inner diameter side and the conical surface 15B on the outer diameter side.

Further, the pillar portion 13 is formed by setting the protruding portion 17A which is close to the large-diameter ring portion as an overlap allowance of 0.2 mm to 0.7 mm, and setting an opening width W1 on the inner diameter in the pocket P to be smaller than the roller diameter Dw1 of the tapered roller 4 on the large-diameter side, and the pillar portion 13 is formed by setting the protruding portion 17B which is close to the large-diameter ring portion as an overlap allowance of 0.1 mm to 0.5 mm, and setting the opening width W2 on the outer diameter of the pocket P to be smaller than the small roller diameter Dw2 of the tapered roller 4. With this, it is possible to improve the insertability and the roller retaining performance of the tapered roller 4 with respect to the cage 10. That is, the pillar portion 13 may be formed by setting at least a portion of the inner diameter in the pocket P as the overlap allowance of 0.2 mm to 0.7 mm, and setting the opening width W1 on the inner diameter in the pocket P to be smaller than the roller diameter Dw1 of the tapered roller 4 on the large-diameter side, and the pillar portion 13 may be formed by sitting at least a portion on the side of the outer diameter in the pocket P as the overlap allowance of 0.1 mm to 0.5 mm, and setting the opening width W2 on the outer diameter of the pocket P to be smaller than the small roller diameter Dw2 of the tapered roller 4.

In addition, since the inclined angle $\alpha_2$ of the cage 10 is set to be 32°30' or greater and smaller than 55°, the cage 10 is applicable to the steep tapered roller bearing 1 of which the contact angle $\alpha$ is 37°30' to 50°.

As described above, the tapered roller bearing 1 of the present embodiment, the small flange in the inner ring is eliminated so as to realize the high moment rigidity and long life span, and accordingly, the length of the roller is made longer. In order to correspond to this, the present embodiment is realized that the tapered roller 4 and the cage 10 are integrally formed by setting the overlap allowance of the cage 10, and improving the roller retaining performance of the cage 10. Therefore, the cage 10 which is adopted for the tapered roller bearing 1 in the present embodiment is realized to function of holding the tapered roller 4 instead of the small flange in the inner ring which usually functions of holding the tapered roller 4, and thereby it is possible to effectively prevent the steep tapered roller bearing 1 of which the contact angle $\alpha$ is 37°30' to 50° from being dropped out.

Figure 7:
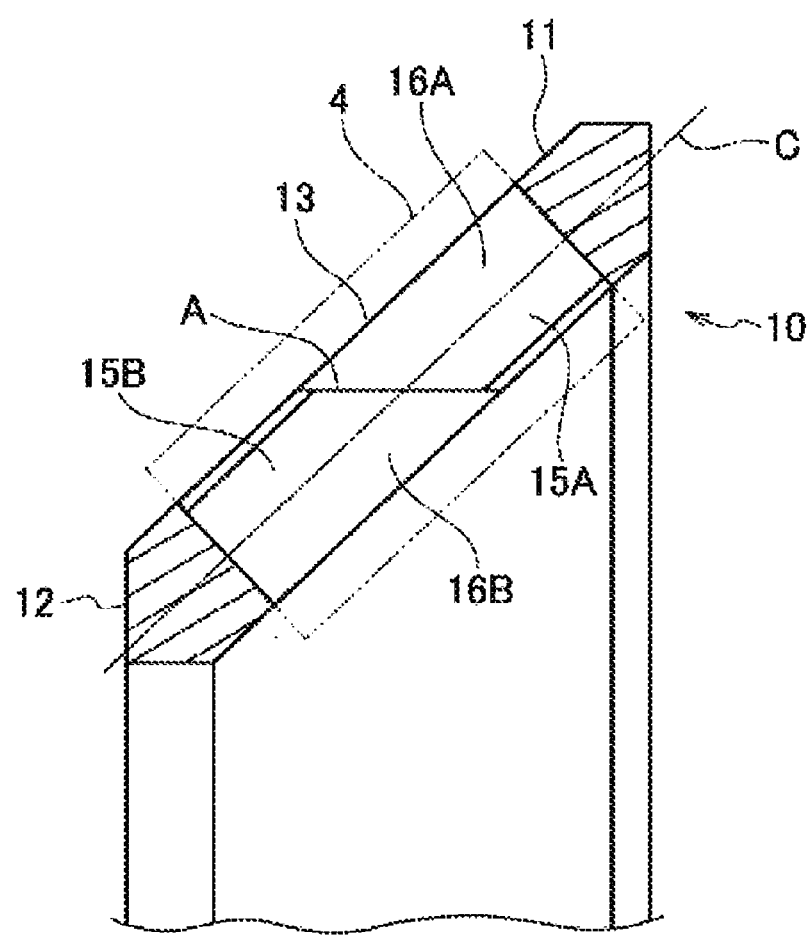
FIG. 7 is an enlarged longitudinal sectional view according to a modification example of a main part of the resin cage for the tapered roller bearing in the first embodiment.

Meanwhile, in the above-described embodiment, the recessed groove 14 is formed along the mold parting line A, but since the recessed groove 14 becomes a cause of deteriorating the strength of the pillar portion 13, the recessed groove 14 is preferably formed as small as possible. For example, as a modification example illustrated in FIG. 7, the mold parting line A may be formed without the recessed groove unlike the above-described embodiment.

Second Embodiment

Figure 8A:
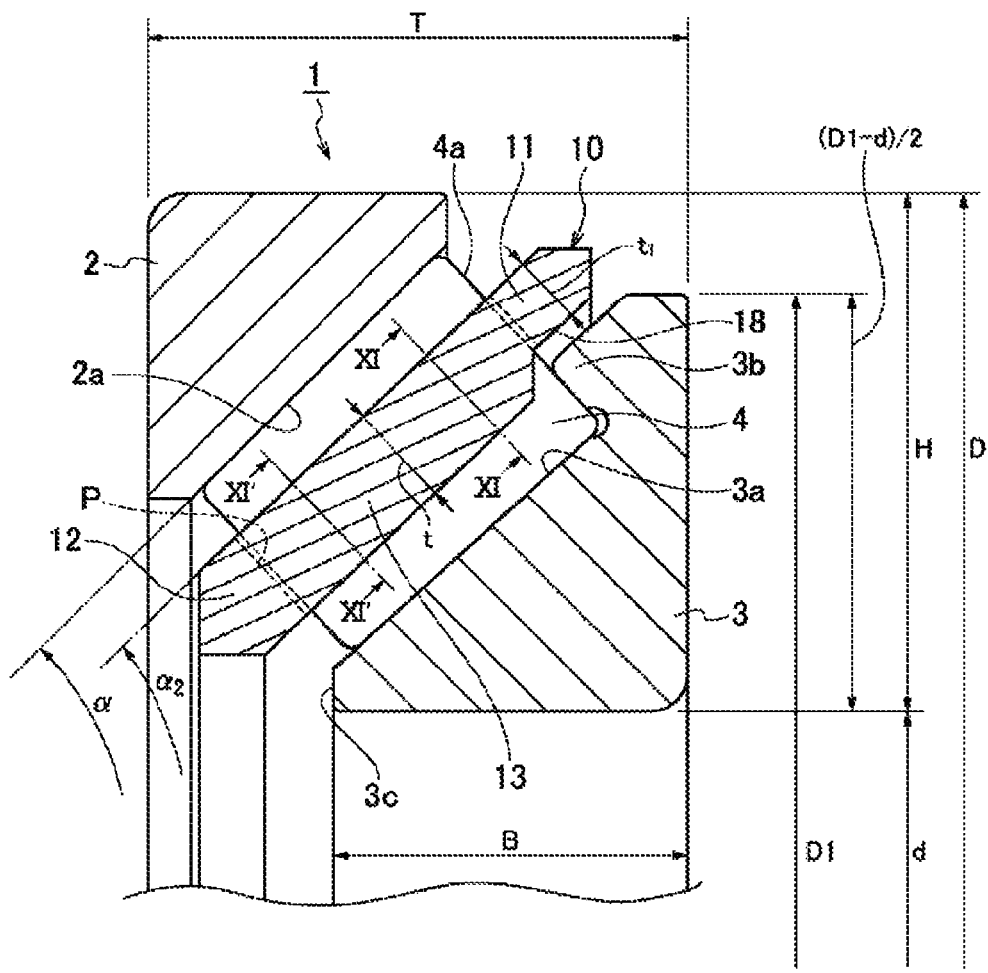
FIG. 8A is a sectional view of a tapered roller bearing according to a second embodiment of the present invention.
Figure 8B:
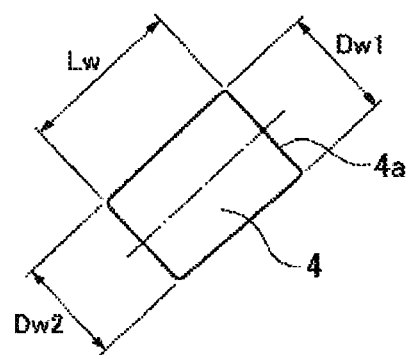
FIG. 8B is a view of a tapered roller.
Figure 9A:
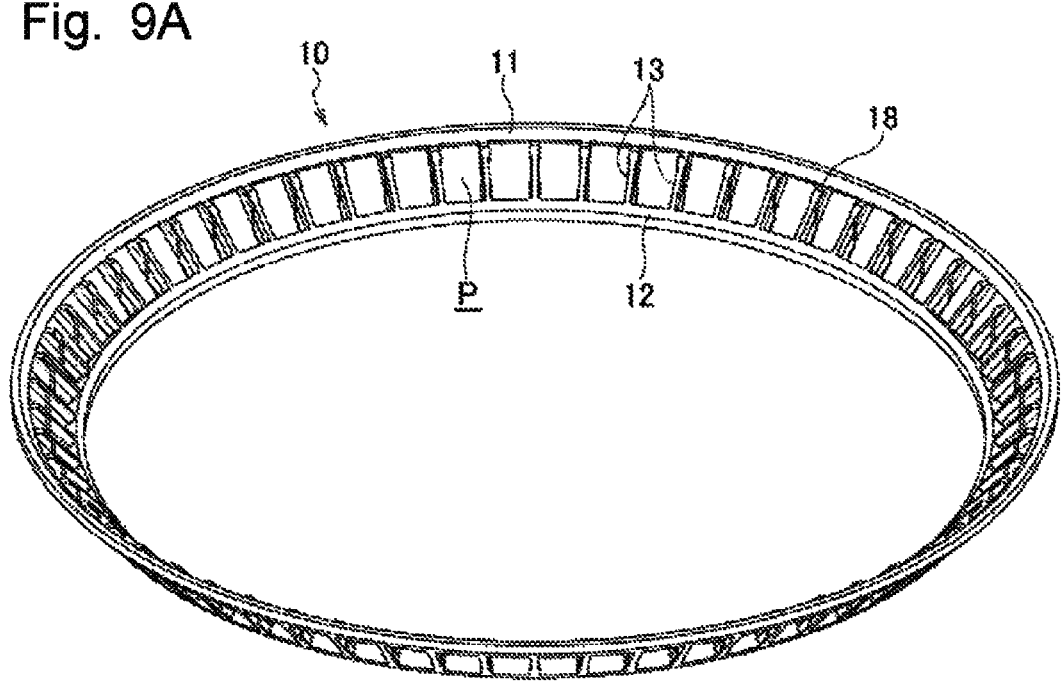
FIG. 9A is an overall perspective view of the cage in FIG. 8.
Figure 9B:
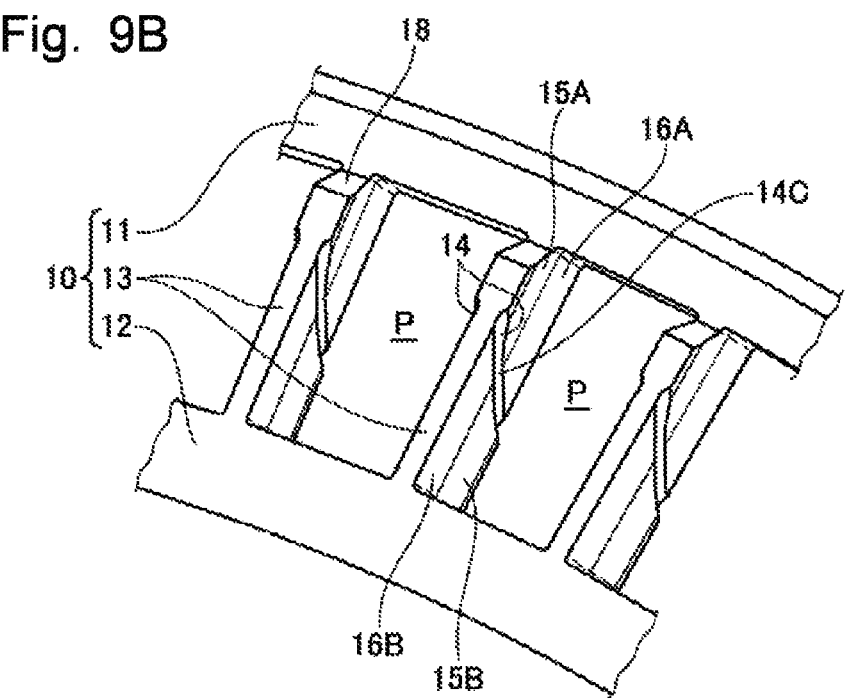
FIG. 9B is a partially enlarged view of FIG. 9A.

Next, the tapered roller bearing according to a second embodiment of the present invention will be described in detail with reference to the drawings. As illustrated in FIGS. 8A and 8B, the tapered roller bearing 1 of the second embodiment includes an outer ring 2 having an outer ring raceway surface 2a on an inner peripheral surface, an inner ring 3 having an inner ring raceway surface 3a on an outer peripheral surface, a plurality of tapered rollers 4 which are rollably arranged between the outer ring raceway surface 2a and the inner ring raceway surface 3a, and a resin cage 10 which defines a plurality of pockets P for housing and holding the plurality of tapered rollers 4 at a predetermined interval.

The outer ring raceway surface 2a which is formed on the outer ring 2 is provided on an inner peripheral surface of the outer ring 2 such that an inside diameter becomes gradually larger toward a large-diameter side from a small-diameter side.

In addition, the inner ring 3 is provided with a large flange 3b which is formed at an end portion on a large-diameter side so as to project to the outside in the radial direction, and the inner ring raceway surface 3a is provided to be continuous to an end surface of a small-diameter side 3c, and to make the outer diameter become gradually larger as the outer diameter toward the large flange 3b from the end surface of small-diameter side 3c. That is, the inner ring 3 includes a flange only at the end portion on the large-diameter side among the end portion on the large-diameter side and the end portion of the small-diameter side.

As illustrated in FIGS. 8A and 8B, in the tapered roller bearing 1 in the present embodiment, a contact angle α which is an angle formed of a contact line of the outer ring raceway surface 2a and a rotation axis of the tapered roller bearing 1 is set to be 45° so as to improve the moment rigidity. Meanwhile, when the contact angle α is within a range of 37°30' to 50°, it is possible to improve the moment rigidity. When a pair of the tapered roller bearings 1 are used by being disposed in the axial direction, a distance between bearings is short, that is, in a case where the distance between the bearings is equal to or smaller by four times than an assembly width T of the bearing, when the contact angle α is set to be in a range of 37°30' to 50°, it is possible to make the distance between points of load application longer, which is particularly effective in improving the moment rigidity of the bearing.

In addition, in the tapered roller bearing 1, since the ratio of a radial cross-section thickness H to an inside diameter d is set to be 0.05<H/d<0.15, and a compact configuration is achieved by setting the thickness to be thin in the radial direction while largely setting the contact angle α to be 45°.

Further, since the inner ring 3 is not provided with the small flange, a roller length Lw (refer to FIG. 8B) can be made longer, and the ratio of the roller length Lw to the inner ring width B is set to be 0.8<Lw/B<1.2 such that the load capacity can be made larger, thereby improving the moment rigidity and the life span. In addition, when the ratio of the roller diameter Dw1 on the large-diameter side to the cross section H in the radial direction is set to be 0.3<Dw1/H<0.6, the size of the tapered roller can be reduced, and the load capacity can be made larger, thereby improving the moment rigidity and the life span.

Further, when the outer diameter of the inner ring is set to be D1, the ratio of the height of the large flange in the inner ring (D1−d)/2 to the wall thickness H of the cross section in the radial direction is set to be 0.7<(D1−d)/2H<0.9, and thus, due to this, it is possible to support the large flange 3b and significantly improve the strength of the large flange 3b. Here, when (D1−d)/2H≥1 is established, the outer diameter of the large flange is larger than the outer diameter of the outer ring, and thus the large flange is likely to be contact with the cage. For this reason, in consideration of the overlapping allowance with the cage, the height of a large flange is required to be set to be (D1−d)/2<H, that is, (D1−d)/2H<1. In addition, in consideration of the margin of the bearing such as the inclination, modification, operation amount, the height of the large flange is preferably set to be (D1−d)/2H<0.9. In addition, when the height of the large flange is set to be (D1−d)/2H≤0.7, it is likely that the strength of the large flange is not sufficient, and thus the height of the large flange is set to be (D1−d)/2H>0.7. Meanwhile, in FIGS. 8A and 8B, T represents an assembly width of the tapered roller bearing and D represents the outer diameter of the tapered roller bearing. In addition, as the tapered roller bearing 1 which is applicable to the present embodiment, generally, the inner diameter of the bearing is set to be in a range of 30 mm to 500 mm, and the outer diameter of the bearing is set to be in a range of 33 mm to 650 mm. This size of the bearing can be preferably used for the reduction gear. Accordingly, since the bearing size is smaller than a bearing size for a wind power generator main spindle, the size of the tapered roller is also small and light. For this reason, as the tapered roller bearing 1, it is preferable to use a cage which is integrally made of resin as described in the present invention.

In addition, as illustrated in FIGS. 8A to 10B, the resin cage 10 includes a large-diameter ring portion 11 and a small-diameter ring portion 12 which are apart from each other in the axial direction, and a plurality of pillar portions 13 which connect between the large-diameter ring portion 11 and the small-diameter ring portion 12, and are provided at a predetermined interval in the circumferential direction. The pillar portion 13 comes in slide contact with the outer peripheral surface of the tapered roller 4 which is a rolling element. In the resin cage 10, a plurality of pockets P, P, . . . are equally formed in a circumferential direction for housing and holding the tapered roller 4, 4, . . . .

As a base resin which is used in a usable resin composition for the cage 10, it is possible to use a thermoplastics resin having a certain or higher level of heat resisting properties. In addition, in order to satisfy a fatigue resistance which is required for the cage 10 and less dimensional change of water absorption, a crystalline resin is preferable, such as polyamide 46, polyamide 66, an aromatic polyamide resin, a polyphenylene sulfide (PPS) resin, and a polyether ether ketone (PEEK) resin. Examples of the aromatic polyamide resin include polyamide 6T/6I such as modified polyamide 6T, polyamide MXD6, polyamide 9T, and polyamide 4T. Among the base resins described above, the polyphenylene sulfide (PPS) resin and the polyether ether ketone (PEEK) resin in which there is almost no dimensional change due to water absorption are particularly preferable.

In addition, this the resin composition includes a reinforcing fiber material in order to achieve a certain level of strength, and prevent the coefficient of linear expansion and water absorption dimension from changing. As an example of the reinforcing fiber material, it is preferable to use a surface-treated product (adhesiveness with the base resin is improved by performing surface treatment by using a silane coupling agent and a sizing agent) such as a glass fiber, a carbon fiber, and an aramid fiber. The content of the reinforcing fiber material in the resin composition is preferably from 10% by weight to 40% by weight with respect to the entire resin composition, and is more preferably from 15% by weight to 30% by weight.

The resin cage 10 is made by injection-molding, and in the present embodiment, is made by injection-molding by using the axial-draw molding that is advantageous in cost.

In addition, similar to the first embodiment, as illustrated in FIG. 5, the mold parting line A is formed substantially in the center portion of the pillar portions 13, 13, . . . which define the pockets P, P, . . . in the radial direction, along the axial direction of the bearing, and thus, the pockets P, P, . . . are formed by combining the fixed side cavity and the movable side cavity.

As illustrated in FIGS. 9A to 10B, on the outer diameter side from a mold parting line A on the facing surfaces of the adjacent pillar portions 13, 13, a first conical surface 15A which comes in slide contact with the outer peripheral surface of the tapered roller 4 is formed and a radially flat surface 16A (a substantially flat surface in a first radial direction) which is continuous to the first conical surface 15A is formed in a portion on the outer diameter side from the first conical surface 15A. In addition on the inner diameter from the mold parting line A on the facing surfaces of the adjacent pillar portions 13, 13, a second conical surface 15B which comes in slide contact with the outer peripheral surface of the tapered roller 4 is formed, and a second radially flat surface 16B (a substantially flat surface in a second radial direction) which is continuous to the second conical surface 15B is formed on the inner diameter side from the second conical surface 15B. Meanwhile, curvatures of the conical surfaces 15A, 15B are set to be greater than the curvature of the tapered roller 4.

In addition, a boundary between the first conical surface 15A and the radially flat surface 16A, and a boundary between the second conical surface 15B and the radially flat surface 16B match each other and overlap with each other in a straight line. Further, these boundaries are indicated by K, in the present embodiment, a boundary K corresponds to the virtual conical surface C connecting to the respective rotation axes (a central axis) of the plurality of tapered rollers 4, 4, . . . and passes through the center position in the pillar portions 13, 13 in the thickness direction.

Meanwhile, the boundary K is preferable to match the virtual conical surface C as described in the present embodiment, but may be set to be slightly deviated from and substantially in parallel with respect to the virtual conical surface C. In addition, the boundary K is not limited to be at the center position in the pillar portions 13, 13 in the thickness direction, but may be set to be slightly apart from the center position in the thickness direction.

Further, the recessed grooves 14, 14 which are along the mold parting line A are formed on the facing surfaces of the adjacent pillar portions 13, 13.

Figure 10A:
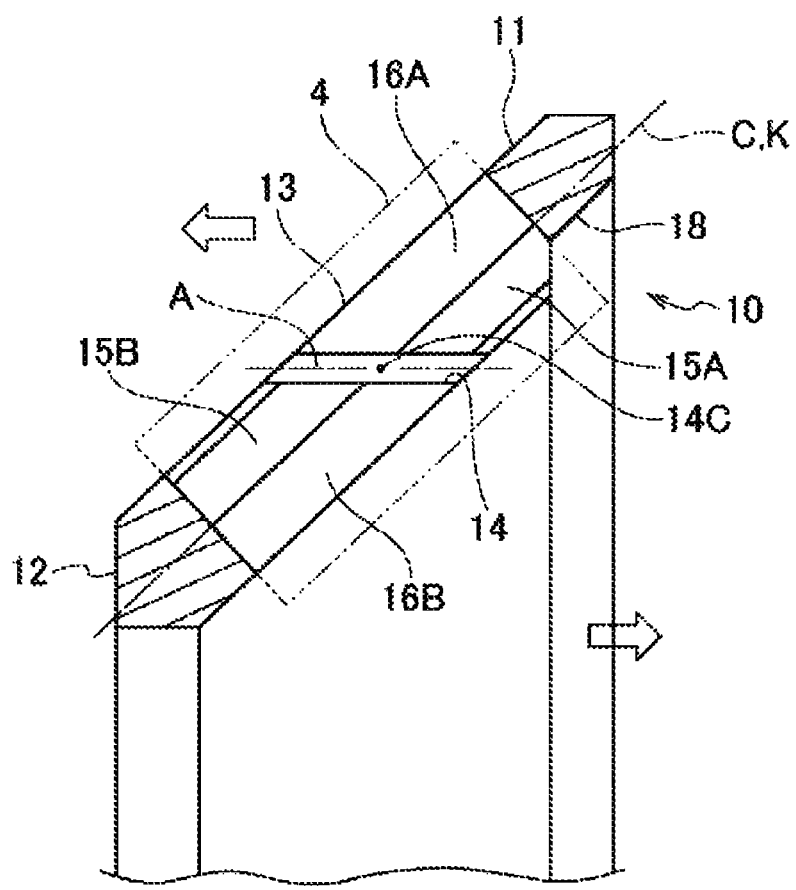
FIG. 10A is an enlarged front longitudinal sectional view of a main part of the resin cage for the tapered roller bearing in FIG. 8.
Figure 10B:
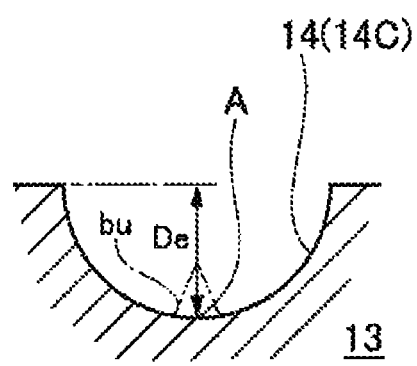
FIG. 10B is a sectional view of a recessed groove at an intersection position of a mold parting line with a boundary.

As illustrated in FIG. 10B, a depth De of the recessed grooves 14, 14 is set to be within the range of 0.1 mm to 0.8 mm. If the depth De of the recessed grooves 14, 14 is less than 0.1 mm, it is likely that the burr collides with the surface of the pocket, and thus the smooth rotation of the tapered roller 4 is inhibited. On the other hand, if the depth De of the recessed grooves 14, 14 is greater than 0.8 mm, the thickness of the pillar portions 13, 13 becomes smaller, and thereby the strength thereof is deteriorated.

In addition, the depth De of the recessed grooves 14, 14 in the vicinity of an intersection position 14C between the boundary K and the mold parting line A is preferably set to be within the range of 0.1 mm to 0.6 mm. The intersection position 14C is exactly a position of the mold parting line A, and thus it is difficult to specify the size of the bottom position of the recessed groove in the intersection position 14C. Therefore, it is possible to know the depth De of the recessed grooves 14, 14 by measuring the size of the bottom position of the recessed groove in the intersection position 14C. The intersection position 14C is changed in accordance with the setting position of the boundary K.

According to such a configuration, since the conical surfaces 15A, 15B which come in slide contact with the outer peripheral surface of the tapered roller 4 and the radially flat surfaces 16A, 16B are alternately formed on the facing surfaces of the adjacent pillar portions 13, 13 by being separated to the outer diameter side and the inner diameter side from the mold parting line A, the tapered roller 4 is held by the conical surface 15A which is positioned on the outer diameter side from the mold parting line A and the conical surface 15B which is positioned on the inner diameter side from the mold parting line A. Therefore, the tapered rollers 4, 4 can be held in a state where the tapered roller bearing is not assembled between the inner ring and the outer ring. Accordingly, with such a cage and roller, it is possible to facilitate the assembly of the tapered roller bearing, for example, the assembly can be easily performed by an automatic machine.

In addition, since there is no need to form the inside protruding portion, which is disclosed in Patent Document 2, for preventing the tapered roller from being dropped out to the inner diameter side, the conical surfaces 15A, 15B which come in slide contact with the outer peripheral surface of the tapered roller 4 and the radially flat surfaces 16A, 16B are alternately formed on the facing surfaces of the adjacent pillar portions 13, 13 by being separated to the outer diameter side and the inner diameter side from the mold parting line A, and thus it is possible to extract the molding in the axial direction as illustrated by an arrow in FIG. 5, thereby performing the injection-molding by using the axial-draw molding. Accordingly, since the mold is not complicated and is not expensive, a manufacturing cost of the resin cage 10 for a tapered roller bearing is not increased.

Further, since the recessed groove 14, 14, . . . along the mold parting line A is formed on the facing surfaces of the pillar portions 13, 13, . . . which define the pockets P, P, . . . , even when a burr occurs due to the mold parting line A in the pocket P, the burr having a size which can be stored in the recessed groove 14 does not interfere with the tapered roller 4. Therefore, it is possible to allow the burr having a size which can be stored in the recessed groove 14. Accordingly, it is possible to significantly reduce a risk that the raceway surfaces in the inner ring and the outer ring are damaged due to the burr from the cage 10 during the rotation of the tapered roller bearing, and a risk of inhibiting the smooth rotation of the tapered roller 4.

In addition, in the present embodiment, the mold parting line A is formed in the center portion of the pillar portion 13 in the radial direction such that the first conical surface 15A and the second conical surface 15B are substantially the same as each other in a length along an extension direction of the pillar portion 13. Due to this, it is possible to reliably prevent the tapered roller 4 from being dropped out to the inner diameter side and the outer diameter side by the first conical surface 15A and the second conical surface 15B. Meanwhile, the mold parting line A is preferably at the center portion of the pillar portion 13 in the radial direction, but as long as it is possible to reliably prevent the tapered roller 4 from being dropped out by the first conical surface 15A and the second conical surface 15B, the mold parting line A may be in the vicinity of the center portion of the pillar portion 13 in the radial direction, that is, may be formed by slightly being deviated from the center portion in the radial direction to the inner diameter side or the outer diameter side.

Figure 11A:
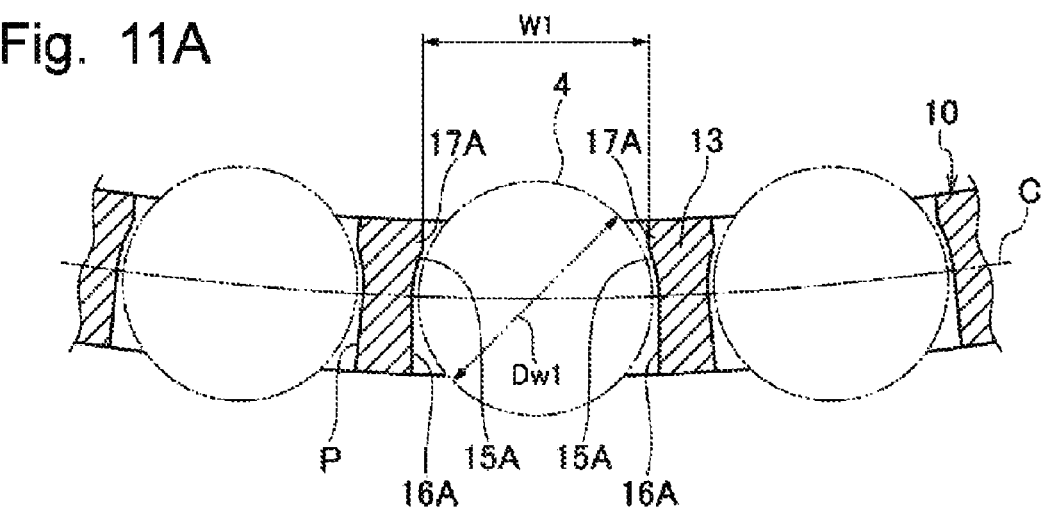
FIG. 11A is a sectional view taken along line XI-XI in FIG. 8.
Figure 11B:
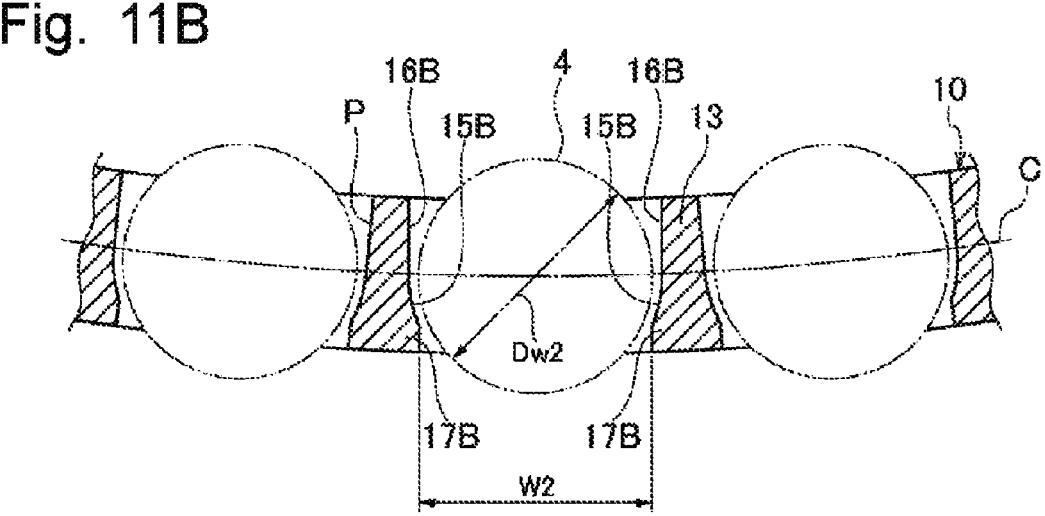
FIG. 11B is a sectional view taken along line XI'-XI' in FIG. 8.

In addition, as illustrated in FIG. 11A, the protruding portion 17A is provided at the end portion of the first conical surface 15A which is formed in a portion which is close to the large-diameter ring portion of the pillar portion 13, and as illustrated in FIG. 11B, the protruding portion 17B is provided at the end portion of the second conical surface 15B which is formed in a portion which is close to the small-diameter ring portion of the pillar portion 13.

In addition, in order to assemble the tapered roller 4 and the resin cage 10, in the protruding portion 17A which is close to the large-diameter ring portion of the pillar portion 13, the opening width W1 on the inner diameter in the pocket P is smaller than the roller diameter Dw1 on the large-diameter side, and in the protruding portion 17B which is close to the small-diameter ring portion of the pillar portion 13, the opening width W2 on the outer diameter of the pocket is smaller than the roller diameter Dw2 on the smaller-diameter side.

Table 2 shows a test result of the roller insertability and the roller retaining performance by changing the overlap allowance (Dw1−W1) in the protruding portion 17A which is close to the large-diameter ring portion of the pillar portion 13 and the overlap allowance (Dw2−W2) in the protruding portion 17B which is close to the small-diameter ring portion of the pillar portion 13 for every 0.1 mm within the range of 0.1 mm to 0.7 mm. It is noted that, other conditions of the test are set to be the same. In addition, in Table, a double circle indicates that both the roller insertability and the roller retaining performance are good, a single circle indicates that either the roller insertability or the roller retaining performance is not as good as a case of the double circle, but is implementable, and a blank column indicates that the test is not performed.

From the above result, it is found that the overlap allowance (Dw1-W1) in the protruding portion 17A which is close to the large-diameter ring portion of the pillar portion 13 is preferably set to be in a range of 0.2 mm to 0.7 mm, and the overlap allowance (Dw2-W2) in the protruding portion 17B which is close to the small-diameter ring portion of the pillar portion 13 is preferably set to be in a range of 0.1 mm to 0.5 mm. Particularly, from a viewpoint of a good balance between the roller insertability and the roller retaining performance, it is preferable that the overlap allowance (Dw1-W1) in the protruding portion 17A which is close to the large-diameter ring portion of the pillar portion 13 is set to be within the range of 0.2 mm to 0.6 mm, and the overlap allowance (Dw2-W2) in the protruding portion 17B which is close to the small-diameter ring portion of the pillar portion 13 is set to be within the range of 0.1 mm to 0.3 mm.

TABLE 2

| | Overlap allowance (mm) | | | | | | |
|---|---|---|---|---|---|---|---|
| | 0.1 | 0.2 | 0.3 | 0.4 | 0.5 | 0.6 | 0.7 |
| Protruding portion 17A close to large-diameter ring | | ◎ | ◎ | ◎ | ◎ | ○ | ○ |
| Protruding portion 17B close to small-diameter ring | ◎ | ◎ | ◎ | ○ | ○ | | |

In addition, as illustrated in FIGS. 8A to 9B, an annular notch portion 18 is formed on the inner peripheral surface of the large-diameter ring portion 11 such that a thickness $t_1$ of the large-diameter ring portion 11 becomes thinner than a thickness t of the pillar portion 13, and the inner peripheral surface of the cage 10 is formed into a stepped shape from the pillar portion 13 to the large-diameter ring portion 11. In addition, the notch portion 18 is notched in a portion of the pillar portion 13 along the radial direction. Due to this, since the thickness of the large-diameter ring portion 11 and a portion in the protruding portion 17A of the pillar portion 13 is also cut out, an amount of elastic deformation of the pillar portion 13 on the large-diameter ring portion becomes larger, and thereby the tapered roller 4 is easily inserted into the cage 10 from the inside thereof. In addition, the large flange 3b of the inner ring 3 can enter the annular notch portion 18, and thus it is possible to increase an amount of the axial loads by making the large flange 3b larger correspondingly. Further, since a portion of the pillar portion 13 is notched along the radial direction, it is possible to avoid the overlapping allowance of the notch portion 18 with the large flange 3b.

Specifically, the thickness of the pillar portion 13 is set to be in a range of 30% to 70% of the averaged roller diameter [(Dw1+Dw2)/2] of the tapered roller 4, and the thickness $t_1$ of the large-diameter ring portion 11 is set to be within the range of 40% to 80% of the thickness of the pillar portion 13.

When a thickness $t_1$ of the large-diameter ring portion 11 is less than 40% of the thickness of the pillar portion 13, the thickness thereof becomes smaller, and thus the strength may be deteriorated. On the other hand, when the thickness $t_1$ of the large-diameter ring portion 11 is greater than 80% of the thickness of the pillar portion 13, there is a concern that the insertability of the tapered roller 4 becomes deteriorated, and it is likely to be in contact with the large flange 3b as illustrated in FIG. 8A in some cases.

As described above, when the depth of the recessed grooves 14, 14 is set to be within the range of 0.1 mm to 0.8 mm, the thickness $t_1$ of the large-diameter ring portion 11 is set to be within the range of 40% to 80% of the thickness of the pillar portion 13, it is possible to sufficiently secure the strength of the cage 10.

In addition, as illustrated in FIG. 8A, the inclined angle $\alpha_2$ of the outer peripheral surface of the cage 10 with respect to the rotation axis of the tapered roller bearing 1 is set to be 32°30' or greater and smaller than 55°, and is preferably set to be from 32°30' to 54° to correspond to the contact angle α of the tapered roller bearing 1.

In order to obtain the high moment rigidity, it is preferable that the tapered roller bearing 1 in the present embodiment adopt a back surface combination (a DB assembly) as the bearing arrangement thereof. In addition, it is possible to improve the moment rigidity in the tapered roller bearing 1 as long as a pre-load is increased; in contrast, since it is likely that the life span of the bearing is decreased, it is preferable to use a long life steel which is subjected to special thermal processing (carburizing processing or carbonitriding processing).

Here, under the load condition of a bearing basic dynamic rated load (Cr)×20% to 60%, the comparison is performed on the moment rigidity and the life span while changing the contact angle. In Table 3, a double circle indicates that the moment rigidity and the life span are implementable and effective, a single circle indicates that the performance is not as good as the case of the double circle, but is implementable, a triangle indicates that the performance is not as good as the case of the single circle but is implementable, and X indicates that the moment rigidity and the life span are not effective. From the result in Table 3, it is found that it is possible to obtain high moment rigidity and a long life span by setting the contact angle to be within the range of 37°30' to 50°.

TABLE 3

| | Contact angle α | Moment rigidity | Life span |
|---|---|---|---|
| Example 1 | 50° | ◎ | ◎ |
| Example 2 | 45° | ◎ | ◎ |
| Example 3 | 42° 30' | ◎ | ◎ |
| Example 4 | 40° | ◎ | ◎ |
| Example 5 | 37°30' | ○ | ○ |
| Comparative Example 1 | 27°30' | X | X |

Next, the influence from each data is verified in view of further compactness by re-examining internal specifications of Examples 2 to 5 having the above satisfactory test results. In addition, a basic dynamic rated load ratio as indicated in Table 4 is a value obtained by comparing with Comparative Example 1 when the basic dynamic rated load of Comparative Example 1 is set to be 1. In Table 4, a double circle indicates that the moment rigidity and the life span are implementable and effective, a single circle indicates that the performance is not as good as the case of the double circle but is implementable, and X indicates that the moment rigidity and the life span are not effective. When comprehensively determining the results obtained from Table 4, as in Examples 6 to 9, when the contact angle satisfies the conditions of the present invention, it is possible to achieve the high moment rigidity and long life span, and when Lw/B, Dw1/H, (D1−d)/2H satisfies the conditions of the present invention, it is possible to achieve the compactness and the improvement of strength of the large flange.

TABLE 4

|  | H/d | Contact angle α | Lw/B | Dw1/H | (D1−d)/2H | Basic dynamic rated load ratio | Moment rigidity | Life span | Compactness | Strength of large flange |
|---|---|---|---|---|---|---|---|---|---|---|
| Comparative Example 1 | 0.11 | 27° 30' | 0.58 | 0.51 | 0.49 | 1.00 | X | X | ◎ | X |
| Example 6 |  | 45° | 0.96 | 0.46 | 0.80 | 0.97 | ◎ | ◎ | ◎ | ◎ |
| Example 7 |  | 42° 30' | 0.94 | 0.48 | 0.77 | 1.04 | ◎ | ◎ | ◎ | ○ |
| Example 8 |  | 40° | 0.93 | 0.51 | 0.74 | 1.11 | ◎ | ◎ | ◎ | ○ |
| Example 9 |  | 37° 30' | 0.93 | 0.54 | 0.72 | 1.17 | ○ | ○ | ◎ | ○ |

Figure 12:
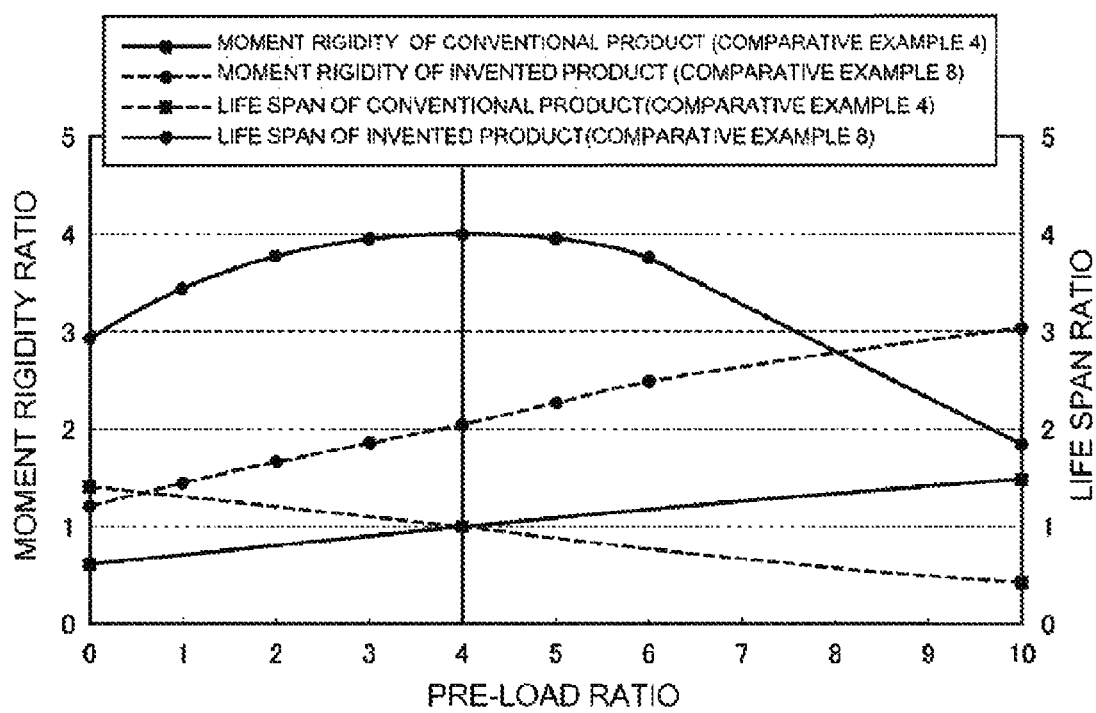
FIG. 12 is a graph illustrating moment rigidity and life span of the tapered roller bearing in the present embodiment and the conventional art.

In addition, Table 5 and FIG. 12 illustrate a moment rigidity ratio and a life span ratio in each pre-load radio of a newly invented product (Example 6) in a case where the moment rigidity and the life span in the tapered roller bearing of a conventional product (Comparative Example 1) are set to be 1 when a pre-load ratio is 4. Here, the pre-load ratio is a value represented by a ratio relative to "1" when setting a pre-load having a certain value is set to be "1". In addition, the pre-load ratio represented by "0" means 0"N".

TABLE 5

|  | H/d | Contact angle α | Lw/B | Dw1/H | (D1−d)/2H | When pre-load ratio is 4 | |
|---|---|---|---|---|---|---|---|
|  |  |  |  |  |  | Moment rigidity | Life span |
| Conventional product (Comparative Example 1) | 0.11 | 27° 30' | 0.58 | 0.51 | 0.49 | 1 | 1 |
| Invented product (Example 6) |  | 45° | 0.96 | 0.46 | 0.8 | 2.1 | 4 |

As illustrated in FIG. 12, the moment rigidity ratio of the tapered roller bearing of the newly invented product (Example 6) is 2.1 relative to the conventional product (Comparative Example 1) when the pre-load ratio is 4, and life span ratio with respect to Comparative Example 1 is 4. In addition, it is found that in both pre-load ratios, the tapered roller bearing in the newly invented product (Example 6) has a value greater than the conventional product (Comparative Example 1) in terms of the moment rigidity ratio and life span ratio.

As described above, according to the resin cage 10 for a tapered roller bearing in the present embodiment, since the conical surfaces 15A, 15B which come in slide contact with the outer peripheral surface of the tapered roller 4 and the radially flat surfaces 16A, 16B are alternately formed on the facing surfaces of the pillar portions 13 which are adjacent to each other by being separated to the outer diameter side and the inner diameter side from the mold parting line A, and the tapered roller 4 is held by the conical surface 15A which is positioned on the outer diameter side from the mold parting line A and the conical surface 15B which is positioned on the inner diameter side from the mold parting line A, and the cage can support the tapered roller 4 while holding the tapered roller in a state where the tapered roller bearing is not assembled between the inner ring and the outer ring. Accordingly, with such a cage and roller, it is possible to facilitate the assembly of the tapered roller bearing, for example, the assembly can be easily performed by an automatic machine.

In addition, according to the present embodiment, since there is no need to form the inside protruding portion, which is disclosed in Patent Document 2 and cannot be formed without the radial draw, for preventing the tapered roller from being dropped out to the inner diameter side, the conical surfaces 15A, 15B which come in slide contact with the outer peripheral surface of the tapered roller 4 and the radially flat surfaces 16A, 16B are alternately formed on the facing surfaces of the adjacent pillar portions 13, by being separated to the outer diameter side and the inner diameter side from the mold parting line A, and thus it is possible to extract a pair of moldings in the axial direction, thereby injection-molding the large-diameter ring portion 11, the small-diameter ring portion 12, and the pillar portion 13 by using the axial-draw molding. Accordingly, since the mold is complicated and is not expensive, a manufacturing cost of the resin cage 10 for a tapered roller bearing is not increased.

Meanwhile, the cage 10 in the present embodiment is not necessarily injection-molded with the axial-draw molding by using a pair of moldings, but may be injection-molded by partially using an insert or a core.

In addition, since the recessed groove 14 along the mold parting line A is formed on the facing surfaces of the pillar portion 13, even when a burr occurs due to the mold parting line A in the pocket P, the burr having a size which can be stored in the recessed groove 14 does not interfere with the tapered roller 4. Therefore, it is possible to allow the burr having a size which can be stored in the recessed groove 14. Accordingly, it is possible to significantly reduce a risk that the tapered roller 4 and the raceway surfaces in the inner ring and the outer ring are damaged because the burr is dropped out from the cage 10 during the rotation of the tapered roller bearing, and a risk of inhibiting the smooth rotation of the tapered roller 4.

In addition, in the present embodiment, the mold parting line A is formed in the center portion of the pillar portion 13 in the radial direction such that the first conical surface 15A and the second conical surface 15B are substantially the same as each other in a length along an extension direction of the pillar portion 13. Due to this, it is possible to reliably prevent the tapered roller 4 from being dropped out to the inner diameter side and the outer diameter side by the first conical surface 15A and the second conical surface 15B.

In addition, the large flange 3b is formed at the end portion on the large-diameter side of the inner ring 3, the inner ring raceway surface 3a is provided to be continuous to the end surface of small-diameter side 3c of the inner ring 3, and the contact angle α is set to be 45°. With this, it is possible to improve the moment rigidity, and make the roller length longer so as to increase the load capacity, thereby achieving the high moment rigidity and the long life span. In addition, it is possible to achieve the high moment rigidity by setting the contact angle α within a range of 37°30' to 50°. A pair of tapered roller bearings 1 are arranged in the axial direction, and in a case where the distance between the bearings is short, that is, in a case where the distance between the bearings is equal to or smaller by four times than an assembly width T of the bearing, when the contact angle α is set to be in a range of 37°30' to 50°, it is possible to make the distance between points of load application longer, which is particularly effective in improving the moment rigidity of the bearing.

In addition, when the inner diameter of the tapered roller bearing 1 is set to be d and the outer diameter of the inner ring is set to be D1, the ratio of the height of the large flange in the inner ring (D1−d)/2 to the wall thickness H of the cross section in the radial direction is set to be 0.7<(D1−d)/2H<0.9, and thus, due to this, it is possible to support the large flange 3b and significantly improve the strength of the large flange 3b.

Further, since the ratio of the roller length Lw to the inner ring width B is set to be 0.8<Lw/B<1.2, the size of the tapered roller can be reduced, and the load capacity can be made larger, thereby achieving the high moment rigidity and the long life span.

In addition, since the ratio of the radial cross-section thickness H and the inner diameter d is set to be 0.05<H/d<0.15, it is possible to achieve a compact configuration by setting the thickness to be thin in the radial direction.

In addition, when the ratio of the roller diameter Dw1 of the tapered roller on the large-diameter side to the cross section H in the radial direction is set to be 0.3<Dw1/H<0.6, the size of the tapered roller can be reduced, and the load capacity can be made larger, thereby achieving the high moment rigidity and the long life span.

In addition, the annular notch portion 18 is formed on the inner peripheral surface of the large-diameter ring portion 11 such that a thickness $t_1$ of the large-diameter ring portion 11 becomes thinner than a thickness t of the pillar portion 13. Due to this, the amount of elastic deformation of the pillar portion 13 on the cage 1 becomes larger, and thereby the tapered roller 4 is easily inserted into the cage 10 from the inside thereof.

Further, the pillar portion 13 is formed by setting the protruding portion 17A which is close to the large-diameter ring portion as an overlap allowance of 0.2 mm to 0.7 mm, and setting an opening width W1 on the inner diameter in the pocket P to be smaller than the roller diameter Dw1 of the tapered roller 4 on the large-diameter side, and the pillar portion 13 is formed by setting the protruding portion 17B which is close to the large-diameter ring portion as an overlap allowance of 0.1 mm to 0.5 mm, and setting the opening width W2 on the outer diameter of the pocket P to be smaller than the roller diameter Dw2 of the tapered roller 4 on the small-diameter side. With this, since the protruding portions 17A and 17B hold the tapered roller 4 between the outer side and the inner side of the pocket of the cage, it is possible to improve the insertability and the roller retaining performance of the tapered roller 4 with respect to the cage 10. That is, the pillar portion 13 may be formed by sitting at least a portion of the inner diameter in the pocket P as the overlap allowance of 0.2 mm to 0.7 mm, and setting the opening width W1 on the inner diameter in the pocket P to be smaller than the roller diameter Dw1 of the tapered roller 4 on the large-diameter side, and the pillar portion 13 may be formed by sitting at least a portion on the side of the outer diameter in the pocket P as the overlap allowance of 0.1 mm to 0.5 mm, and setting the opening width W2 on the outer diameter of the pocket P to be smaller than the roller diameter Dw2 of the tapered roller 4 on the small-diameter side.

Further, in addition, since the inclined angle α2 of the cage 10 is set to be 32°30' or greater and smaller than 55°, the cage 10 is applicable to the steep tapered roller bearing 1 of which the contact angle α is 37°30' to 50°.

As described above, the tapered roller bearing 1 of the present embodiment, the small flange in the inner ring is eliminated so as to realize the high moment rigidity and long life span, and accordingly, the length of the roller is made longer. In order to cope with this, the present embodiment is realized that the tapered roller 4 and the cage 10 are assembled by setting the overlap allowance of the cage 10, and improving the roller retaining performance of the cage 10. Therefore, the cage 10 which is adopted for the tapered roller bearing 1 in the present embodiment is realized to function of holding the tapered roller 4 instead of the small flange in the inner ring which usually functions of holding the tapered roller 4, and thereby it is possible to effectively prevent the steep tapered roller bearing 1 of which the contact angle α is 37°30' to 50° from being dropped out.

Figure 13:
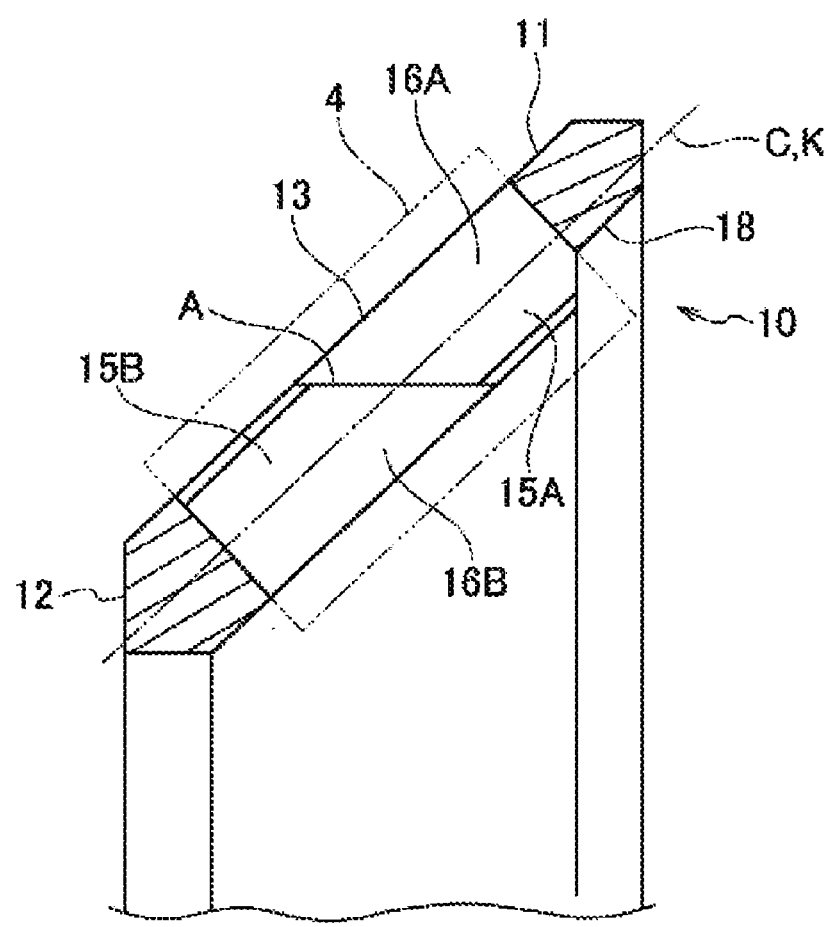
FIG. 13 is an enlarged longitudinal sectional view according to a modification example of a main part of the resin cage for the tapered roller bearing in the second embodiment.

Meanwhile, in the above-described embodiment, the recessed groove 14 is formed along the mold parting line A, but since the recessed groove 14 becomes a cause of deteriorating the strength of the pillar portion 13, the recessed groove 14 is preferably formed as small as possible. For example, as a modification example illustrated in FIG. 13, the mold parting line A may be formed without the recessed groove unlike the above-described embodiment.

Figure 14:
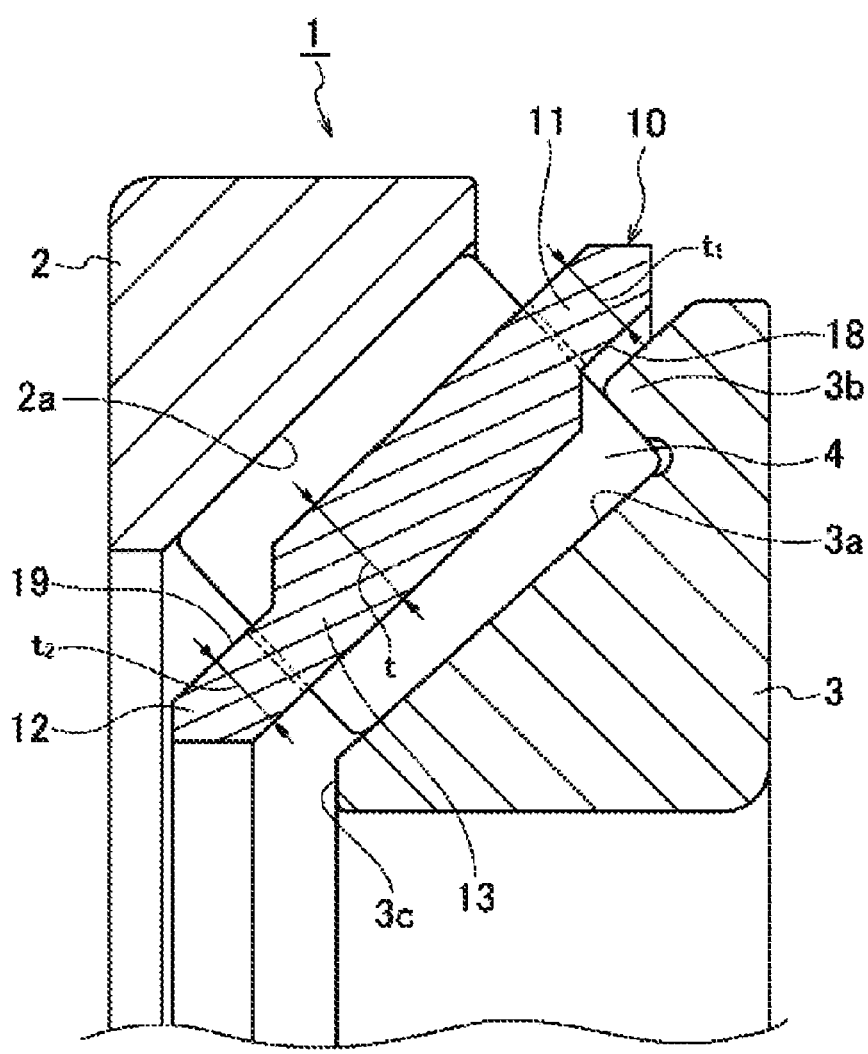
FIG. 14 is an enlarged longitudinal sectional view according to another modification example of a main part of the tapered roller bearing in the second embodiment.

In addition, in the above-described embodiment, the annular notch portion 18 is formed on the inner peripheral surface of the large-diameter ring portion 11, but in the present invention, the annular notch portion may be formed on at least one of the inner peripheral surface of the large-diameter ring portion 11 and the outer peripheral surface of the small-diameter ring portion 12. For example, as a modification example illustrated in FIG. 14, the annular notch portions 18, 19 may be formed on both of the inner peripheral surface of the large-diameter ring portion 11 and the outer peripheral surface of the small-diameter ring portion 12 such that the thicknesses $t_1$, $t_2$ of both ring portions 11, 12 is smaller than the thickness of the pillar portion 13 so as to easily insert the tapered roller 4 from both sides of the cage 10.

Third Embodiment

Next, the tapered roller bearing according to the third embodiment of the invention will be described with reference to the drawings. In the drawings, the same or equivalent components as those in the second embodiment are denoted by the same reference numerals and the description thereof will not be repeated or briefly made.

Figure 15:
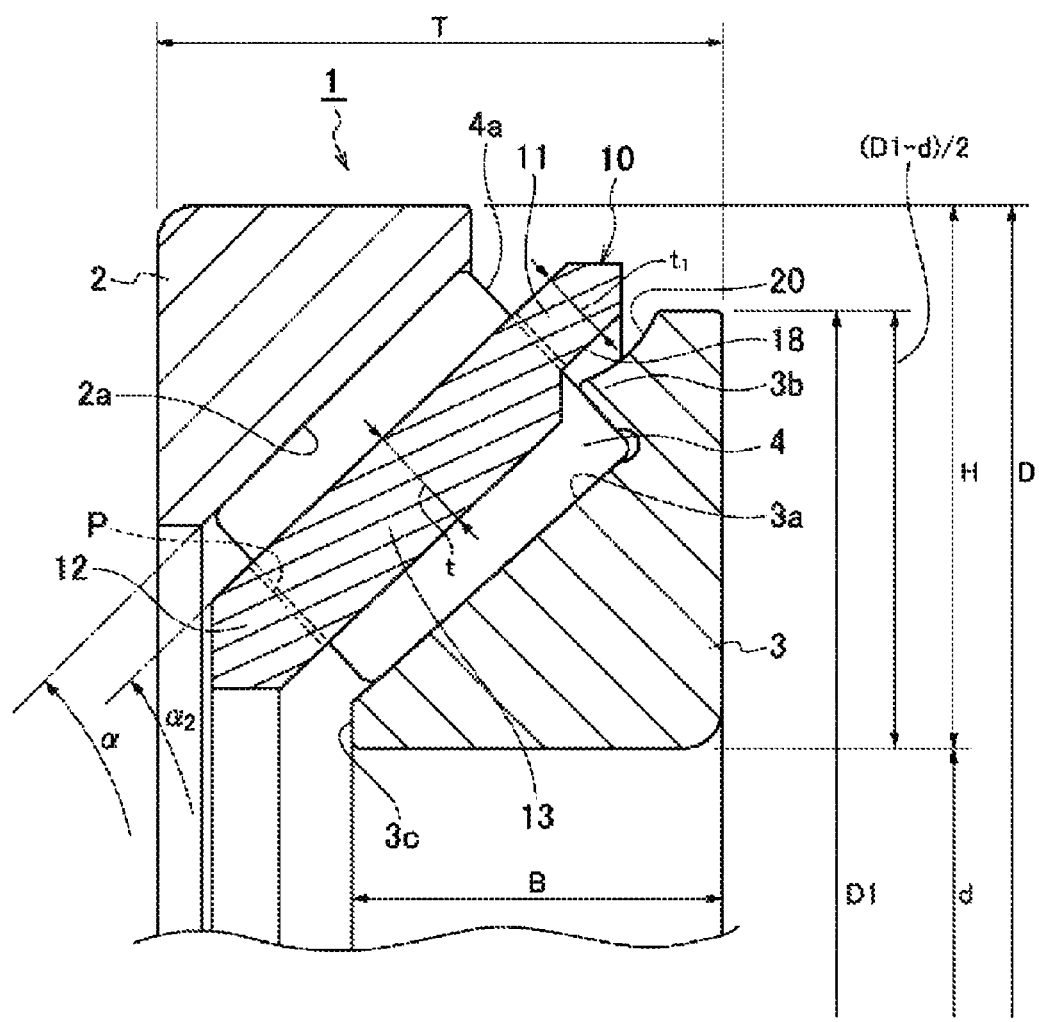
FIG. 15 is a sectional view of the tapered roller bearing according to a third embodiment of the present invention.
Figure 16:
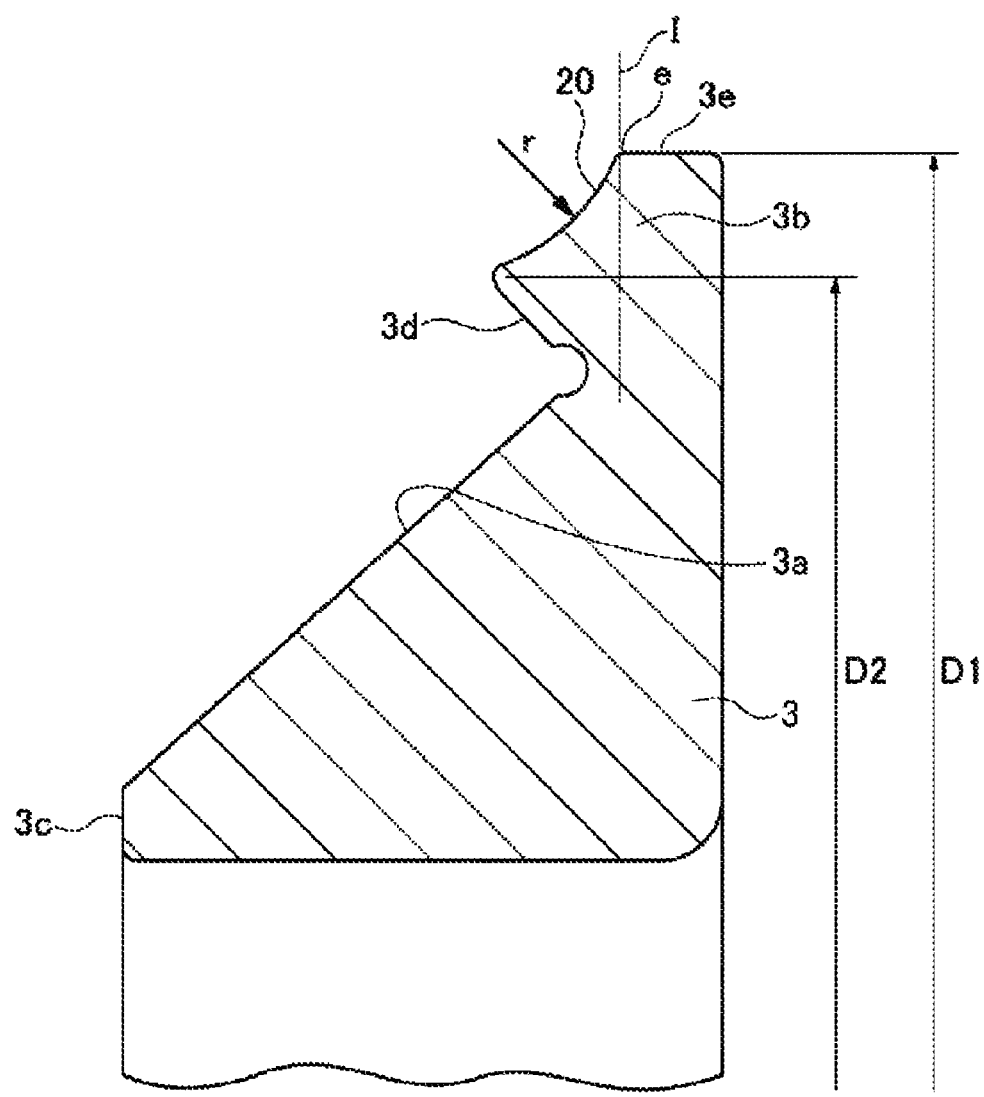
FIG. 16 is a sectional view of an inner ring in FIG. 15.

In the third embodiment, as illustrated in FIGS. 15 and 16, the large flange 3b of the inner ring 3 includes a recessed portion 20 in a position facing the large-diameter ring portion 11 of the cage 10, particularly in the present embodiment, a position facing the notch portion 18 between a large flange surface 3d which is contact with a large end surface 4a of the tapered roller 4 and an outer diameter surface 3e of a large flange which is a cylindrical surface of a diameter larger than a maximum outer diameter position (a position indicated by a diameter D2) of the large flange surface 3d. Due to this, it is possible to avoid the overlapping allowance of the large flange 3b with the large-diameter ring portion 11 of the cage 10, and suppress breakage caused by the wear of the cage 10. On the other hand, it is possible to make the thickness of the large-diameter ring portion 11 in the cage 10 large to be maximum by providing the recessed portion 20 in the large flange 3b, thereby improving the strength of the cage 10. In addition, since it is possible to hold a lubricant in the recessed portion 20, it is possible to improve lubricity of the large flange surface 3d of the inner ring 3. Particularly, it is possible to widen a space for holding the lubricant by the notch portion 18 and the recessed portion 20. As the lubricant, grease or lubricating oil can be used, and in a case of using the lubricating oil, it is preferable to use the lubricating oil having high viscosity so as to be easily held in the recessed portion 20.

A cross-section profile of the recessed portion 20 is formed into a curved surface which is formed of a single arc of a curvature radius r. Meanwhile, in the present embodiment, chamfering is performed on a boundary between the outer diameter surface 3e of the large flange (a position indicated by a diameter D1) and the recessed portion 20, and the boundary between the maximum outer diameter position (the position indicated by the diameter D2) of the large flange surface 3d and the recessed portion 20, but the chamfering shape is not limited. In addition, in order to secure the strength of the large flange 3b, the recessed portion 20 is formed on the inner side of a virtual surface I which includes a ridge line e (which is indicated by a point e in a sectional view shown in FIG. 16) in which the recessed portion 20 and the outer diameter surface 3e of the large flange intersect with each other, and is perpendicular to the rotation axis in the axial direction.

Meanwhile, in consideration of the balance between the holding properties of the lubricant and the strength of the large flange 3b, when the outer diameter of the inner ring, that is, a diameter of the outer diameter surface 3e of the large flange is set to be D1, and a diameter at the maximum outer diameter position on the large flange surface 3d is set to be D2, the curvature radius r of the cross-section profile of the recessed portion 20 which is formed of the single arc is preferably set to be r (D1−D2)/2.

Figure 17:
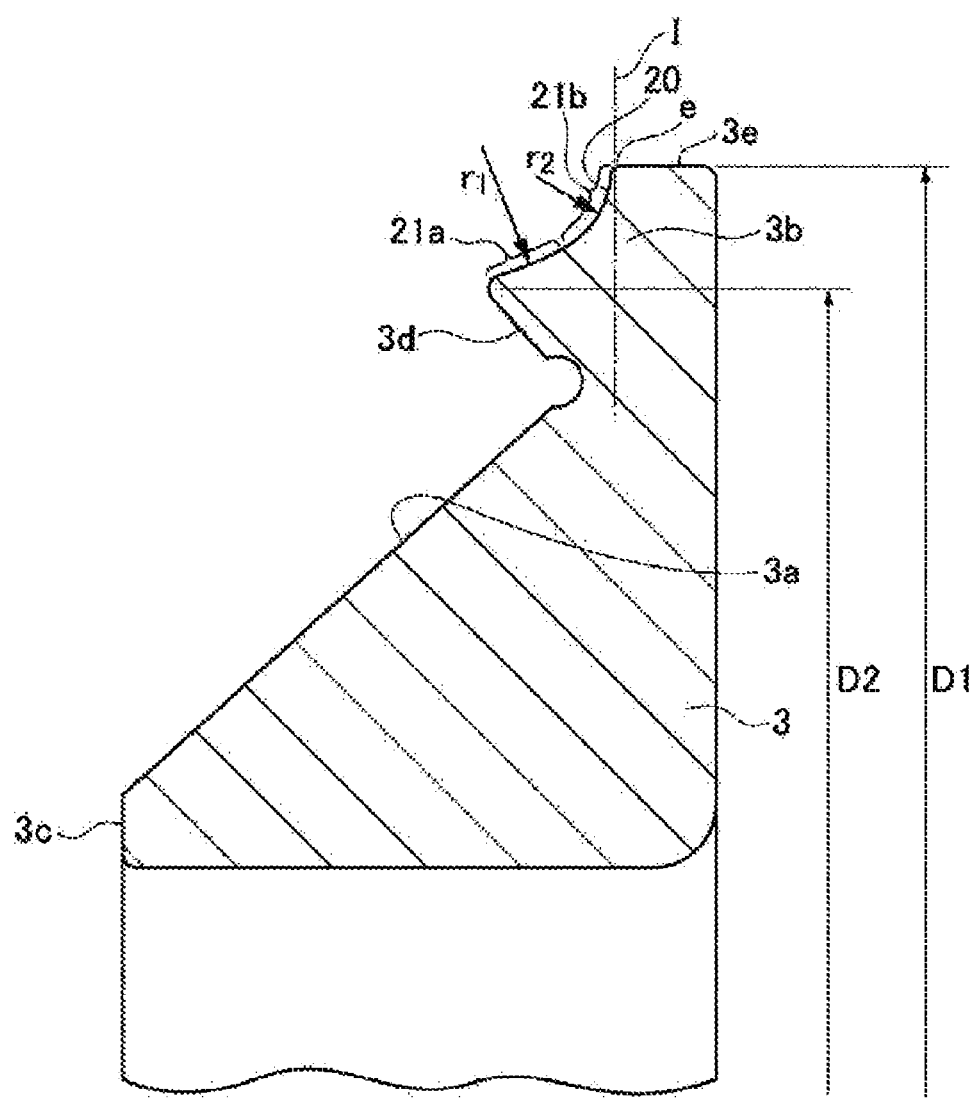
FIG. 17 is a sectional view of the inner ring of the tapered roller bearing according to a first modification example in the third embodiment.

In addition, in the above-described embodiment, the recessed portion 20 is set as the single arc from the viewpoint of ease of processing, but is not limited thereto, for example, as illustrated in FIG. 17, the recessed portion 20 may be formed of a curved surface which is formed of a plurality of arcs 21a, 21b including curvature radiuses r1, r2, or may be formed of a stepped surface.

Figure 18A:
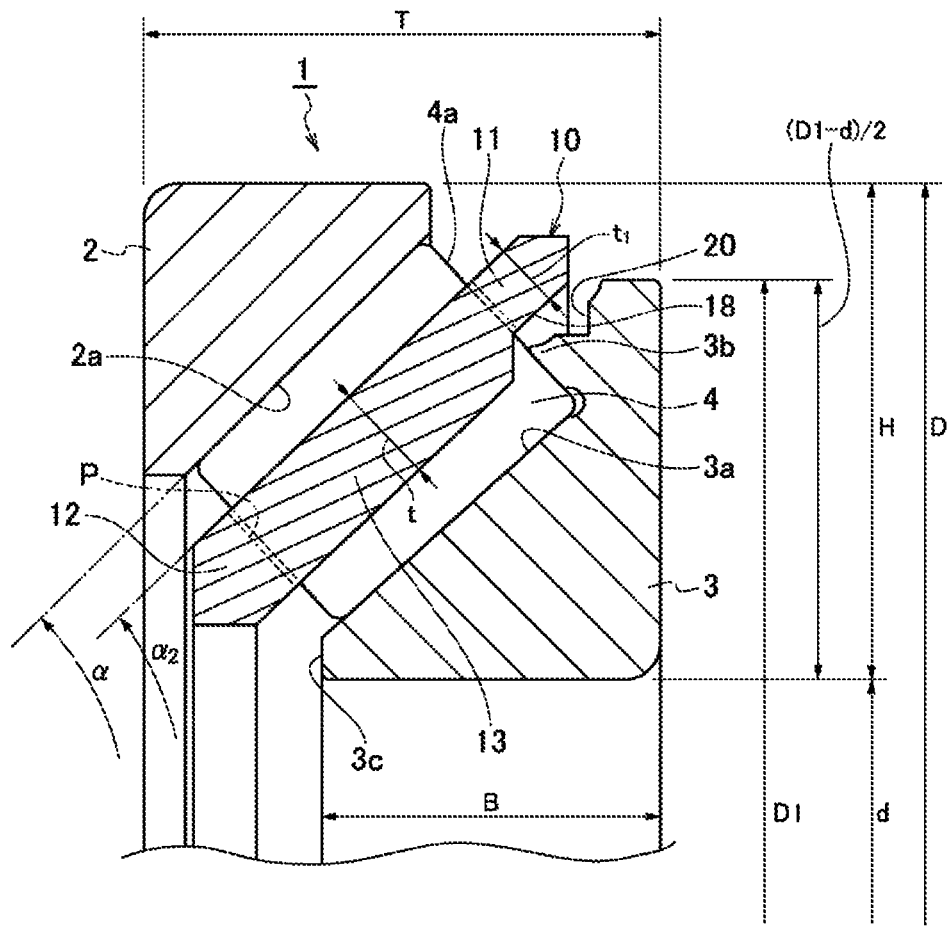
FIG. 18A is a sectional view of a tapered roller bearing according to a second modification example in the third embodiment.
Figure 18B:
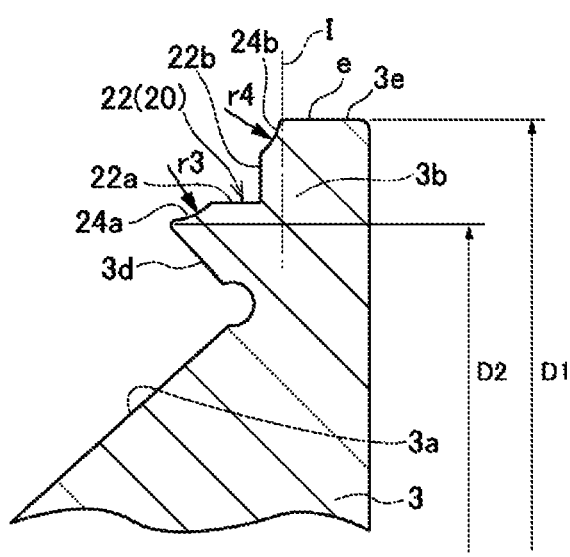
FIG. 18B is a partially enlarged sectional view of an inner ring thereof.

FIGS. 18A and 18B illustrates a modification example in which the recessed portion 20 is formed of a stepped surface 22 and two curved surfaces 24a, 24b which include an arc having curvature radiuses r3, r4. The stepped surface 22 includes a cylindrical surface 22a which is close to the large flange surface and an annular flat surface 22b which is close to the outer surface of the large flange and extends to the outside in the radial direction from the cylindrical surface 22a. Meanwhile, also in this modification example, the chamfering is performed on the boundary between the outer diameter surface 3e of the large flange (the position indicated by the diameter D1) and the recessed portion 20, and the boundary between the maximum outer diameter position (the position indicated by the diameter D2) of the large flange surface 3d and the recessed portion 20, but the chamfering shape is not limited. The boundary between the cylindrical surface 22a and the annular flat surface 22b may be formed into a curved surface. Further, the curvature radiuses r3, r4 of two curved surfaces 24a, 24b may be the same as each other.

As described above, according to the tapered roller bearing 1 in present embodiment, since the large flange 3b is formed on the end portion on the large-diameter side of the inner ring 3, and the large flange 3b includes the recessed portion 20 in the position facing the large-diameter ring portion 11 of the cage 10, it is possible to avoid the overlapping allowance of the large flange 3b with the cage 10, and improve the strength of the cage 10. In addition, it is possible to improve lubricity of the large flange surface 3d of the inner ring 3 by holding the lubricant in the recessed portion 20.

Meanwhile, the recessed portion 20 may be formed between the large flange surface 3d which is in contact with the large end surface 4a of the tapered roller 4 and the outer diameter surface 3e of the large flange which is the cylindrical surface of the diameter larger than the maximum outer diameter position of the large flange surface 3d, and may be formed of any one of the curved surface, the stepped surface, and a combination of the curved surface and the stepped surface.

In addition, in a case where the recessed portion 20 is formed of the curved surface, the cross-section profile of the recessed portion 20 may be formed of the single arc or the plurality of arcs 21a, 21b. Particularly, in a case where the recessed portion 20 is formed of the single arc, when the diameter of the outer diameter surface 3e of the large flange is set to be D1, and the diameter of the maximum outer diameter position on the large flange surface 3d is set to be D2, it is possible to achieve both the holding properties of the lubricant and the strength of the large flange of the cross-section profile of the recessed portion 20 by setting the curvature radius r to be r (D1−D2)/2.

Since the recessed portion 20 is formed on the inner side of a virtual surface I which includes a ridge line e in which the recessed portion 20 and the outer diameter surface 3e of the large flange intersect with each other, and is perpendicular to the rotation axis, it is possible to secure the strength of the large flange 3b.

In addition, as illustrated in FIGS. 18A and 18B, in a case where the recessed portion 20 is formed of the stepped surface 22 and two curved surfaces 24a, 24b, the stepped surface 22 is formed by including a cylindrical surface 22a close to the large flange surface 3d and an annular flat surface 22b which is close to the outer diameter surface 3e of the large flange and extends to the outside from the cylindrical surface 22a in the radial direction, and thus it is possible to hold much more lubricants.

Figure 19A:
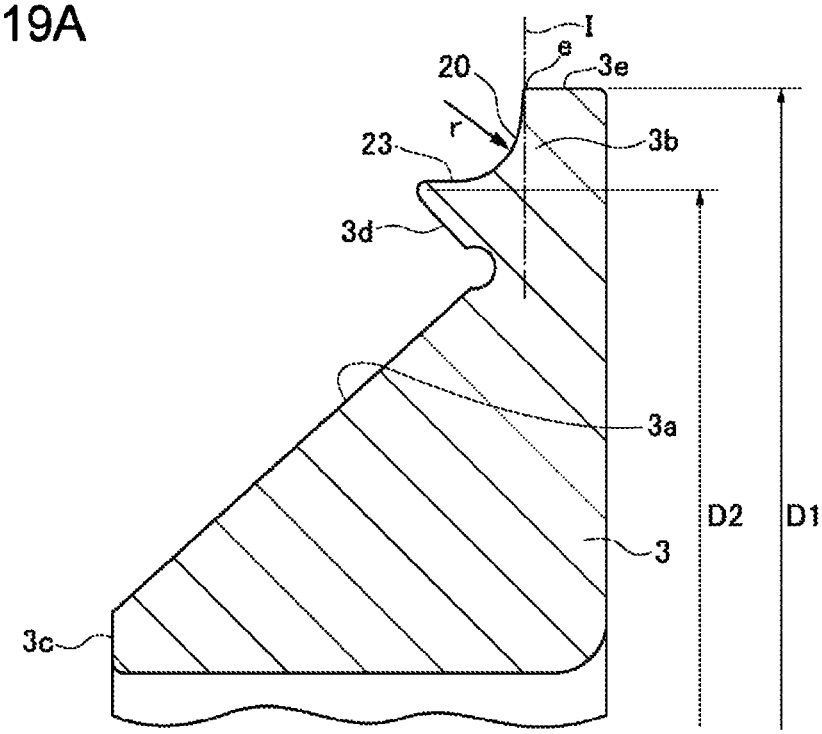
FIG. 19A is a sectional view of an inner ring of a tapered roller bearing according to a third modification example in the third embodiment.
Figure 19B:
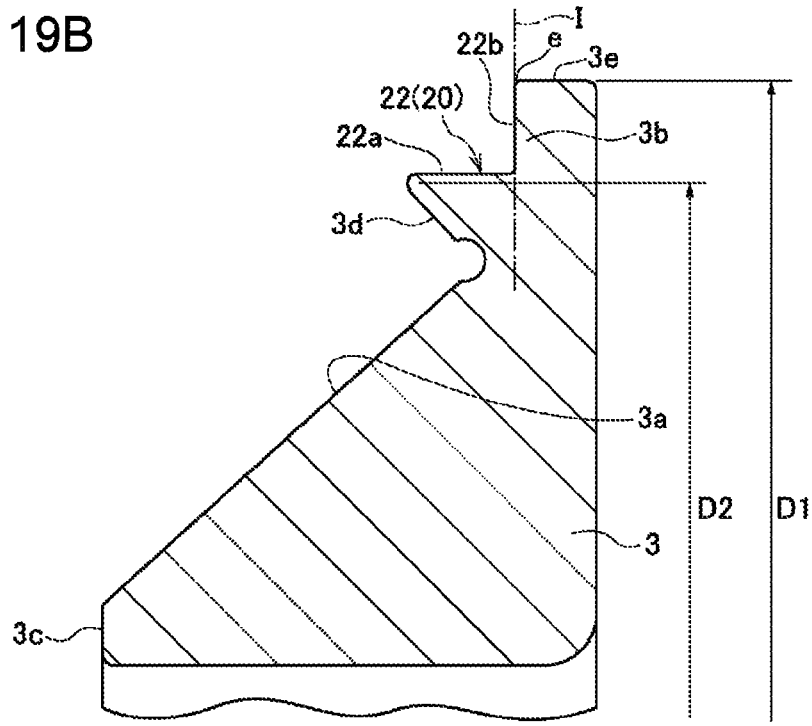
FIG. 19B is a section view of an inner ring of a tapered roller bearing according to a fourth modification example in the third embodiment.

For example, in the inner ring 3 of a modification example as illustrated in FIG. 19A, the recessed portion 20 formed of the curved surface may be formed by performing a certain chamfering on the maximum outer diameter position of the large flange surface 3d, and then forming the cylindrical surface 23 which extends along the axial direction. Alternatively, in the inner ring 3 of a modification example as illustrated in FIG. 19B, after performing a certain chamfering on the maximum outer diameter position of the large flange surface 3d, and then forming, the recessed portion 20 which includes the curved surface may be formed of a stepped surface 22 which includes a cylindrical surface 22a connecting to the large flange surface 3d, and an annular flat surface 22b connecting to the outer diameter surface 3e of the large flange. Thereby, it is possible to hold much more lubricants.

In addition, the outer diameter surface 3e of the large flange of the inner ring 3 may be formed by the maximum outer diameter portion of the recessed portion 20 instead of the cylindrical surface.

Fourth Embodiment

Next, the tapered roller bearing according to the fourth embodiment of the invention will be described with reference to the drawings. In the drawings, the same or equivalent components as those in the first embodiment are denoted by the same reference numerals and the description thereof will not be repeated or briefly made.

Figure 20A:
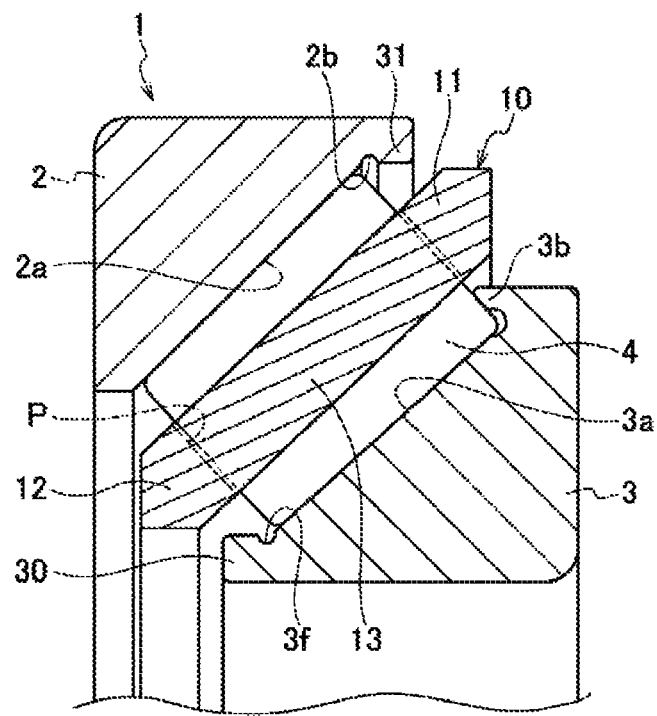
FIG. 20A is a sectional view of a tapered roller bearing according to a fourth embodiment.
Figure 20B:
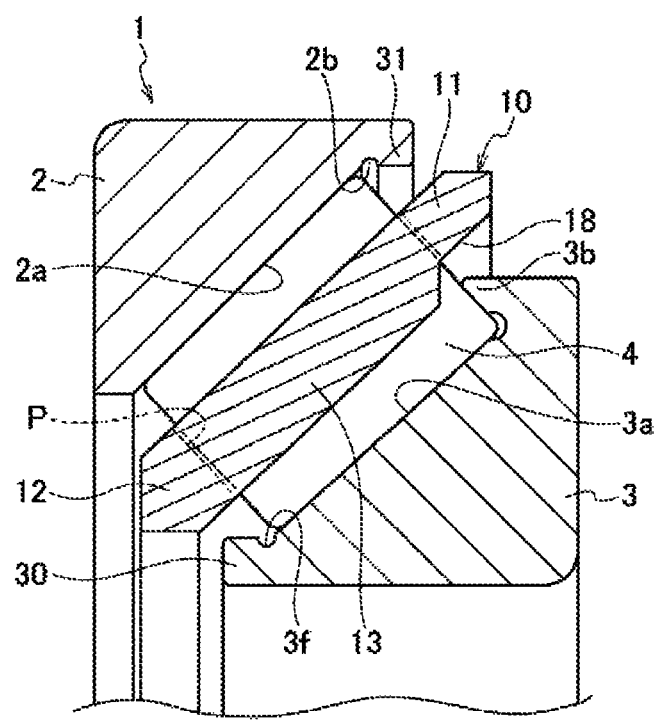
FIG. 20B is a sectional view of a tapered roller bearing according to a modification example in the fourth embodiment.

As illustrated in FIG. 20A, in the tapered roller bearing in the fourth embodiment, an axially extended portion 30 extending in the axial direction is provided and a clearance groove 3f is formed at an end portion on the small-diameter side of the inner ring 3 without providing the small flange. In addition, an axially extended portion 31 extending in the axial direction is provided and a clearance groove 2b is formed at an end portion on the large-diameter side of the outer ring 2. These axially extended portions 30, 31 are provided so as to properly adjust the width sizes of the inner ring 3 and the outer ring 2 in the axial direction, that is, in terms of the design, it is possible to adjust the width size of the inner ring and the outer ring that a client requires, without changing internal specifications of the inner diameter of the inner ring and the outer diameter of the outer ring and the bearing. Meanwhile, FIG. 20B illustrates a case where the tapered roller bearing is provided with the axially extended portions 30, 31 with respect to the tapered roller bearing in the second embodiment. Other configurations and operations are the same as those in the first and second embodiments.

It is noted that the present invention is not limited to the above-described embodiments, but may be properly modified and improved.

The tapered roller bearing of the present invention is applicable to various reduction gears for a motor, an industrial robot, and a transport device, for example, an orthogonal axis gear reducer and a hypoid reduction gear.

In addition, "the substantially flat surface in the first radial direction" and "the substantially flat surface in the second radial direction" in the present invention are not limited to the flat surface extending in the radial direction or the flat surface in which the facing surfaces of the adjacent pillar portion which are parallel to each other, but may be a flat surface facing the radial direction so as to be moldable by using the axial-draw molding, and may be the curved surface having a small curvature, or a shape made by combining the curved surface and the flat surface, without being limited to the flat surface described in the first and second embodiments.

The present invention is based on the Japanese Patent Application No. 2013-078999 filed on Apr. 4, 2013, and Japanese Patent Application No. 2013-079000 filed on Apr. 4, 2013, the entire contents of which are incorporated herein by reference.

REFERENCE SIGNS LIST 1 tapered roller bearing
2 outer ring
2a outer ring raceway surface
3 inner ring
3a inner ring raceway surface
3b large flange (flange portion)
3d large flange surface
3e outer diameter surface of large flange
4 tapered roller
4a large end surface
10 resin cage for tapered roller bearing
11 large-diameter ring portion
12 small-diameter ring portion
13 pillar portion
14 recessed groove
15A conical surface on inner diameter side, first conical surface
15B conical surface on outer diameter side, second conical surface
16A radially flat surface (substantially flat surface in first radial direction)
16B radially flat surface (substantially flat surface in second radial direction)
17A, 17B protruding portion
20 recessed portion
22 stepped surface
A mold parting line
B inner ring width
C virtual conical surface connecting rotation axis of tapered roller
D outer diameter
D1 outer diameter of inner ring (diameter on outer diameter surface of large flange)
D2 diameter at maximum outer diameter position of large flange surface
Dw1 roller diameter on large-diameter side
H radial cross-section thickness
Lw roller length
P pocket
T assembly width
d inner diameter
e ridge line
r curvature radius
α contact angle
$α_2$ inclined angle of cage

The invention claimed is:

1. A resin cage for a tapered roller bearing, the resin cage being injection-molded such that a large-diameter ring portion and a small-diameter ring portion which are separated from each other in an axial direction are connected to each other by a plurality of pillar portions which is in slide contact with an outer peripheral surface of a tapered roller which is a rolling element, and a plurality of pockets are equally formed in a circumferential direction for housing and holding the tapered roller, wherein a mold parting line which is extended in the axial direction is formed in the pillar portion defining the pockets, wherein on facing surfaces of the adjacent pillar portions, on an outer diameter side from the mold parting line, a first conical surface which comes in slide contact with the outer peripheral surface of the tapered roller is formed, and a substantially flat surface in a first radial direction which is continuous to the first conical surface is formed in a portion on the outer diameter side from the first conical surface, and wherein on an inner diameter side from the mold parting line, a second conical surface which comes in slide contact with an outer peripheral surface of the tapered roller is formed, and a flat surface in a second radial direction which is continuous to the second conical surface is formed in a portion on the inner diameter side from the second conical surface.

2. The resin cage for a tapered roller bearing according to claim 1,
wherein the large-diameter ring portion, the small-diameter ring portion, and the pillar portion of the cage are molded by extracting a pair of moldings in the axial direction.

3. The resin cage for a tapered roller bearing according to claim 1,
wherein a recessed groove along the mold parting line is formed on the facing surface of the pillar portion.

4. The resin cage for a tapered roller bearing according to claim 3,
wherein a depth of the recessed groove is within a range of 0.1 mm to 0.8 mm.

5. The resin cage for a tapered roller bearing according to claim 4,
wherein a boundary between the first conical surface and the substantially flat surface in the first radial direction, and a boundary between the second conical surface and the substantially flat surface in the second radial direction match each other, and
wherein the depth of the recessed groove is within a range of 0.1 mm to 0.6 mm in the vicinity of an intersection position of the boundary and the mold parting line.

6. The resin cage for a tapered roller bearing according to claim 1,
wherein the mold parting line is formed substantially in a center portion of the pillar portion in the radial direction such that the first conical surface and the second conical surface are substantially the same as each other in a length along an extension direction of the pillar portion.

7. The resin cage for a tapered roller bearing according to claim 1,
wherein the pillar portion is formed such that an opening width on an inner diameter side in the pocket is smaller than a roller diameter of the tapered roller on a large-diameter side while an overlapping allowance ranges from 0.2 mm to 0.7 mm in at least a portion on the inner diameter side of the pocket and that an opening width on an outer diameter side in the pocket is smaller than a roller diameter of the tapered roller on a small-diameter side while an overlapping allowance ranges from 0.1 mm to 0.5 mm in at least a portion on the outer diameter side of the pocket.

8. The resin cage for a tapered roller bearing according to claim 1,
wherein an annular notch portion is formed on at least one of an inner peripheral surface of the large-diameter ring portion and an outer peripheral surface of the small-diameter ring portion such that a thickness of the ring portion is smaller than a thickness of the pillar portion.

9. The resin cage for a tapered roller bearing according to claim 8,
wherein the notch portion is formed on the inner peripheral surface of the large-diameter ring portion,
wherein a thickness of the large-diameter ring portion is 40% to 80% of a thickness of the pillar portion, and
wherein the thickness of the pillar portion is 30% to 70% of an averaged roller diameter of the tapered roller.

10. The resin cage for a tapered roller bearing according to claim 1,
wherein an inclination angle of the cage is set to be equal to or greater than 32° 30' and less than 55°.

11. The resin cage for a tapered roller bearing according to claim 1, the resin cage being injection-molded using an axial-draw molding,
wherein on facing surfaces of the adjacent pillar portions, on the outer diameter side from the mold parting line, a conical surface on the inner diameter side which comes in slide contact with the outer peripheral surface of the tapered roller and which is the first conical surface is formed in a portion on the inner diameter side from a virtual conical surface connecting to respective rotation axes of a plurality of tapered rollers, and the substantially flat surface in the first radial direction which is continuous to the conical surface on the inner diameter side is formed in a portion on the outer diameter side from the virtual conical surface, and on the inner diameter side from the mold parting line, a conical surface on the outer diameter side which comes in slide contact with the outer peripheral surface of the tapered roller and which is the second conical surface is formed in a portion on the outer diameter side from the virtual conical surface, and the substantially flat surface in the second radial direction which is continuous to the conical surface on the outer diameter side is formed in a portion on the inner diameter side from the virtual conical surface.

12. A tapered roller bearing comprising:
an outer ring which includes an outer ring raceway surface on an inner peripheral surface;
an inner ring which includes an inner ring raceway surface on an outer peripheral surface;
a plurality of tapered rollers which are rollably arranged between the outer ring raceway surface and the inner ring raceway surface; and
the resin cage according to claim 1,
wherein a flange is formed at an end portion on a large-diameter side of the inner ring, the inner ring raceway surface is provided to be continuous to an end surface of a small-diameter side of the inner ring, and a contact angle α of the tapered roller bearing is set to be within a range of 37° 30' to 50°.

13. The tapered roller bearing according to claim 12,
wherein a flat surface or a recessed portion which faces a notch portion of the cage is formed in the flange such that the flange is formed into a shape of entering the notch portion.

14. A tapered roller bearing comprising:
an outer ring which includes an outer ring raceway surface on an inner peripheral surface;
an inner ring which includes an inner ring raceway surface on an outer peripheral surface;
a plurality of tapered rollers which are rollably arranged between the outer ring raceway surface and the inner ring raceway surface; and
the resin cage according to claim 1,
wherein a flange is formed only at an end portion on a large-diameter side among the end portion on the large-diameter side and an end portion on a small-diameter side of the inner ring, and a contact angle α of the tapered roller bearing is set to be within a range of 37° 30' to 50°.

* * * * *